US00RE48779E

(19) United States
(12) Reissued Patent
Go et al.

(10) Patent Number: US RE48,779 E
(45) Date of Reissued Patent: Oct. 19, 2021

(54) BACKLIGHT UNIT AND LIQUID CRYSTAL DISPLAY INCLUDING THE SAME

(71) Applicant: LG ELECTRONICS INC., Seoul (KR)

(72) Inventors: Wangseop Go, Seoul (KR); Sangho Seo, Seoul (KR)

(73) Assignee: LG ELECTRONICS INC., Seoul (KR)

(21) Appl. No.: 15/902,162

(22) Filed: Feb. 22, 2018

Related U.S. Patent Documents

Reissue of:
(64) Patent No.: 8,456,592
Issued: Jun. 4, 2013
Appl. No.: 12/868,072
Filed: Aug. 25, 2010

U.S. Applications:
(63) Continuation of application No. 14/468,241, filed on Aug. 25, 2014, now Pat. No. Re. 46,795, which is an application for the reissue of Pat. No. 8,456,592.
(Continued)

(30) Foreign Application Priority Data

Nov. 12, 2009 (KR) ..... 10-2009-0108953

(51) Int. Cl.
*G02F 1/1335* (2006.01)
*G02F 1/1333* (2006.01)
(Continued)

(52) U.S. Cl.
CPC ..... *G02F 1/133308* (2013.01); *G02B 6/009* (2013.01); *G02B 6/0088* (2013.01); *G02F 1/133615* (2013.01)

(58) Field of Classification Search
CPC ..... G02F 1/133308; G02F 1/133615; G02F 2001/133314; G02B 6/0088; G02B 6/009
(Continued)

(56) References Cited

U.S. PATENT DOCUMENTS 5,727,862 A 3/1998 Wu
6,835,961 B2 12/2004 Fukayama
(Continued)

FOREIGN PATENT DOCUMENTS

CN 1407380 4/2003
CN 1461965 12/2003
(Continued)

OTHER PUBLICATIONS

Chinese Office Action issued in related Application No. 201080035175.6 dated Feb. 8, 2014.
(Continued)

*Primary Examiner* — Henry N Tran
(74) *Attorney, Agent, or Firm* — KED & Associates LLP

(57) ABSTRACT

A backlight unit and a liquid crystal display including the same are provided. The backlight includes a light guiding plate, a reflector, and at least one LED assembly including an LED light source, a substrate, and a support plate. A plurality of protrusions formed on a cover of the liquid crystal display are configured to mate to a plurality of concave portions formed on the light guiding plate, the reflector, and the LED assembly to mount the various components of the liquid crystal display onto the cover.

8 Claims, 23 Drawing Sheets

Related U.S. Application Data

(60) Provisional application No. 61/260,540, filed on Nov. 12, 2009, provisional application No. 61/301,358, filed on Feb. 4, 2010.

(51) Int. Cl.
*F21V 8/00* (2006.01)
*G02F 1/13357* (2006.01)

(58) Field of Classification Search
USPC ..... 349/58, 61–63, 65, 67, 56
See application file for complete search history.

(56) References Cited

U.S. PATENT DOCUMENTS

| | | | | |
|---|---|---|---|---|
| 6,950,154 | B2 | 9/2005 | Lee | |
| 7,106,393 | B2 * | 9/2006 | Lee | 349/58 |
| 7,118,265 | B2 | 10/2006 | Cho | |
| 7,224,416 | B2 | 5/2007 | Cha et al. | |
| 7,248,307 | B2 | 7/2007 | Han | |
| 7,380,972 | B2 | 6/2008 | Shimizu | |
| 7,505,668 | B2 | 3/2009 | Hong | |
| 7,594,746 | B2 | 9/2009 | Shin et al. | |
| 7,883,259 | B2 | 2/2011 | Hung | |
| 7,944,527 | B2 | 5/2011 | Jeon et al. | |
| 8,059,226 | B2 | 11/2011 | Chang | |
| 8,390,758 | B2 * | 3/2013 | Jung | G02B 6/0088 349/58 |
| 8,414,176 | B2 * | 4/2013 | Shin | G02B 6/009 362/628 |
| 2003/0043314 | A1 | 3/2003 | Lee et al. | |
| 2003/0223020 | A1 | 12/2003 | Lee | |
| 2005/0243238 | A1 | 11/2005 | Cha et al. | |
| 2005/0254236 | A1 | 11/2005 | Fu et al. | |
| 2006/0007367 | A1 | 1/2006 | Cho | |
| 2006/0007708 | A1 | 1/2006 | Lee | |
| 2006/0203519 | A1 | 9/2006 | Shin et al. | |
| 2007/0030696 | A1 | 2/2007 | Lv et al. | |
| 2007/0195551 | A1 | 8/2007 | Shin | |
| 2007/0258264 | A1 | 11/2007 | Hong | |
| 2007/0297195 | A1 | 12/2007 | Hu | |
| 2008/0088763 | A1 | 4/2008 | Toriyama et al. | |
| 2008/0180600 | A1 | 7/2008 | Oh | |
| 2008/0186425 | A1 | 8/2008 | Chang et al. | |
| 2008/0232134 | A1 | 9/2008 | Weng et al. | |
| 2008/0304288 | A1 | 12/2008 | Iwasaki | |
| 2009/0103328 | A1 | 4/2009 | Iwasaki | |
| 2009/0180055 | A1 | 7/2009 | Kim et al. | |
| 2009/0256987 | A1 | 10/2009 | Jeon et al. | |

FOREIGN PATENT DOCUMENTS

| | | | |
|---|---|---|---|
| CN | 1672091 | | 9/2005 |
| CN | 1705847 | | 12/2005 |
| CN | 1892363 | | 1/2007 |
| CN | 1952753 | | 4/2007 |
| CN | 1991500 | | 7/2007 |
| CN | 101089700 | | 12/2007 |
| CN | 101303482 | | 11/2008 |
| CN | 201146014 | | 11/2008 |
| EP | 1 956 422 | | 1/2008 |
| EP | 1 956 422 | | 8/2008 |
| EP | 1 975 653 | | 10/2008 |
| EP | 2 202 456 | A2 | 6/2010 |
| EP | 2 251 721 | | 11/2010 |
| EP | 2 259 103 | A2 | 12/2010 |
| JP | 2003-107467 | A | 4/2003 |
| JP | 2004-279864 | A | 10/2004 |
| JP | 2005-326860 | | 11/2005 |
| JP | 2005-534071 | A | 11/2005 |
| JP | 2006-098500 | | 4/2006 |
| JP | 2006-253108 | A | 9/2006 |
| JP | 2008-129259 | A | 6/2008 |
| JP | 2009-049017 | A | 3/2009 |
| JP | 4306289 | | 7/2009 |
| KR | 10-1998-0075053 | A | 11/1998 |
| KR | 10-2003-0091570 | | 12/2003 |
| KR | 10-2004-0012195 | | 2/2004 |
| KR | 10-2007-0063290 | A | 6/2007 |
| KR | 10-2007-0084641 | | 8/2007 |
| KR | 10-2007-0090493 | | 9/2007 |
| KR | 10-2007-0107482 | A | 11/2007 |
| KR | 10-2008-0008743 | | 1/2008 |
| KR | 10-2008-0008743 | A | 1/2008 |
| KR | 10-2008-0073597 | A | 8/2008 |
| TW | 200537173 | | 11/2005 |
| WO | WO 2009/107275 | | 9/2009 |

OTHER PUBLICATIONS

Chinese Office Action issued in related Application No. 201080066322.6 dated Aug. 26, 2014.
European Patent Certificate No. EP 2 499 537 B1 issued in related Application No. 10830111.0 dated Feb. 25, 2015.
European Search Report issued in Application No. 10846223.5 dated Jul. 12, 2013.
European Search Report issued in Application No. 14003271.5 dated Dec. 5, 2014.
European Search Report issued in Application No. 14004097.3 dated Feb. 23, 2015.
European Search Report issued in related Application No. 14004288.8 dated Mar. 16, 2015.
U.S. Office Action issued in U.S. Appl. No. 12/868,072 dated Sep. 28, 2012.
U.S. Notice of Allowance issued in U.S. Appl. No. 12/868,072 dated Feb. 7, 2013.
U.S. Office Action issued in U.S. Appl. No. 12/868,053 dated Mar. 12, 2013.
U.S. Notice of Allowance issued in U.S. Appl. No. 12/868,053 dated Aug. 30, 2013.
Chinese Office Action dated May 3, 2017 issued in Application No. 201410486069.X (with English translation).
Chinese Notice of Allowance dated Aug. 29, 2017 issued in Application No. 201410720671.5 (English translation attached).
U.S. Notice of Allowance dated Nov. 8, 2017 issued in co-pending U.S. Appl. No. 14/481,423.
U.S. Office Action dated Aug. 3, 2016 issued in co-pending U.S. Appl. No. 14/481,423.
Chinese Office Action dated Jan. 26, 2017 issued in Application No. 201510011873.7 (English translation attached).
U.S. Office Action dated Aug. 30, 2017 issued in co-pending U.S. Appl. No. 14/967,790.
U.S. Office Action dated Sep. 12, 2017 issued in co-pending U.S. Appl. No. 14/536,540.
Korean Office Action dated Sep. 30, 2015 issued in Application No. 10-2009-0108953.
Korea Office Action dated Apr. 5, 2016 issued in Application No. 10-2010-0022199.
European Search Report dated May 4, 2018 issued in Application No. 18156894.0.
European Search Report dated Mar. 5, 2020 issued in Application No. 20154989.6.
International Search Report and Written Opinion dated Jun. 23, 2011 (PCT/KR2010/006982).
International Search Report and Written Opinion dated Jun. 27, 2011 (PCT/KR2010/006979).

* cited by examiner

BACKLIGHT UNIT AND LIQUID CRYSTAL DISPLAY INCLUDING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

[This application] *More than one reissue application has been filed for the reissue of U.S. Pat. No. 8,456,592. The reissue applications numbers are 14/468,241 filed on Aug. 25, 2014, 14/481,423 filed on Sep. 9, 2014 and 15/902,162 (present application) filed on Feb. 22, 2018. This application is a continuation reissue of application Ser. No. 14/468, 241, which is an application for reissue of U.S. Pat. No. 8,456,592, which* claims priority under 35 U.S.C. § 119 to Korean Application No. 10-2009-0108953 filed on Nov. 12, 2009, Provisional Application Nos. 61/260,540 filed Nov. 12, 2009, and 61/301,358 filed Feb. 4, 2010, respectively, whose entire disclosure(s) is/are hereby incorporated by reference.

BACKGROUND

1. Field

A backlight unit and a liquid crystal display including the same are disclosed herein.

2. Background

Backlight units and liquid crystal displays including the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
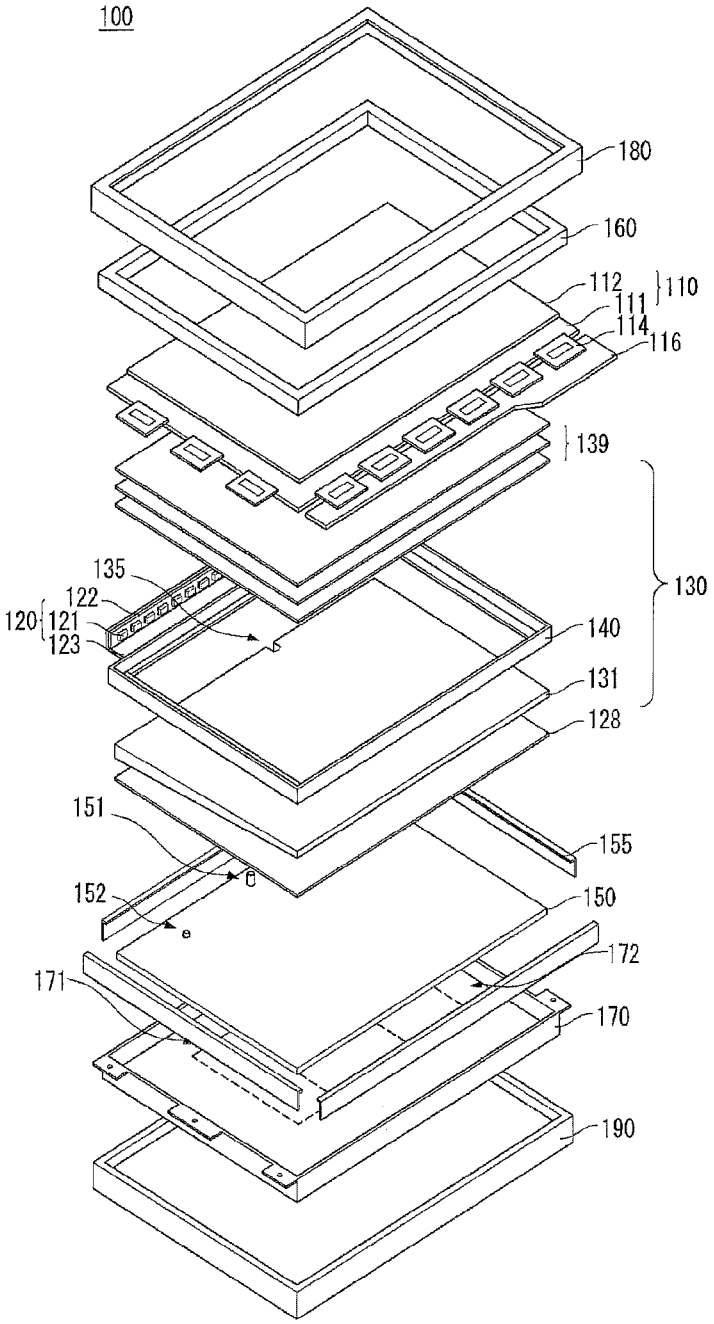
FIG. 1 is a perspective view illustrating a liquid crystal display according to an embodiment.

Referring to FIG. 1, a liquid crystal display 100 according to an embodiment includes a liquid crystal panel 110, a backlight unit 130, a main support 140, a bottom cover 150, a side cover 155, a top cover 160, a bracket 170, a front case 180, and a rear case 190. The liquid crystal panel 110 may display an image and may include a first substrate 111 and a second substrate 112 attached to a liquid crystal layer interposed there between. Although not shown in FIG. 1, a plurality of scan lines and data lines may intersect in a matrix shape in the first substrate 111 called a TFT array substrate, thereby defining a plurality of pixels. Each pixel may be turned on or off by a thin film transistor (TFT) provided on each pixel, including a pixel electrode connected thereto and positioned at the thin film transistor.

The second substrate 112 may be a color filter substrate that includes color filters of a red color R, a green color G, and a blue color B corresponding to each of a plurality of pixels. The second substrate 112 may also include a black matrix for enclosing the color filters and for covering a non-display element such as a scan line. A data line and a thin film transistor may also be provided. Further, a transparent common electrode for covering the color filters and the black matrix may be provided in the second substrate 112.

A printed circuit board (PCB) 116 may be connected to at least one side of the liquid crystal panel 110 using, as an intermediary, a connection member 114 formed of, for example, a flexible PCB, a tape carrier package (TCP), or other appropriate connecting structures. Thus, in a modularization process, the PCB 116 may be closely disposed at a side surface of the main support 140 or a rear surface of the bottom cover 150.

In the liquid crystal panel 110 of this embodiment, when a thin film transistor, selected on a scan line basis, is turned on by an on/off signal on a scan line, a data voltage may be transferred to a corresponding pixel electrode through a data line. Thus, an orientation of liquid crystal molecules may be changed due to an electric field between the pixel electrode and a common electrode, thereby representing a transmittance difference.

In the liquid crystal display 100 according to this embodiment, the backlight unit 130 may provide light from a rear surface of the liquid crystal panel 110. The backlight unit 130 may include an LED assembly 120, a white color or silver color reflector 128, a light guiding plate 131 (light guide panel) positioned on the reflector 128, and a plurality of optical sheets 139 positioned at an upper part of the light guiding plate 131. The LED assembly 120 may be positioned at one side of the light guiding plate 131 and may comprise a plurality of LED light sources 121, a substrate 122 in which the LED light sources 121 may be mounted to be separated by a predetermined gap, and a support 123 that may be mounted on the bottom cover 150.

In the light guiding plate 131, light applied by the LED light source 121 may be spread onto a wide area of the light guiding plate 131 as light is reflected several times as it advances through the light guiding plate 131. Thus, the light guiding plate 131 may provide a primary surface light source to the liquid crystal panel 110. A rear surface of the light guiding plate 131 may comprise various shapes or patterns in order to supply a uniform surface light source. Further, the light guiding plate 131 may comprise at least one first concave portion 135 in order to be coupled and supported to the bottom cover 150.

The reflector 128 may be positioned at a rear surface of the light guiding plate 131 to improve luminance of light by reflecting light passing through a rear surface of the light guiding plate 131 toward the liquid crystal panel 110. The reflector 128 may comprise at least one second concave portion 135 that may be coupled to the bottom cover 150.

A plurality of optical sheets 139 may be positioned on the light guiding plate 131 may including a diffusion sheet, a protection sheet, and a focusing sheet in which a prism or a microlens may be formed. Therefore, the optical sheet 139 may diffuse or focus the surface light from the light guiding plate 131, thereby more uniformly providing the light to the liquid crystal panel 110.

The liquid crystal panel 110 and the backlight unit 130 may be modularized through the top cover 160, the main support 140, the bottom cover 150, and the side cover 155. The top cover 160 may have a quadrangular frame shape that covers an upper surface and a side surface of the liquid crystal panel 110 and displays an image generated on the liquid crystal panel 110 through an opening on a front surface of the top cover 160.

The bottom cover 150 may function as a base for a liquid crystal display and may couple the liquid crystal panel 110 and the backlight unit 130 on a plate having a quadrangular shape. The bottom cover 150 may comprise at least one first protruding portion 151 that may couple to the light guiding plate 131 and at least one second protruding portion 152 that may couple to the LED assembly 120. Further, the side cover 155 may be coupled to the bottom cover 150. The main support 140 may have a quadrangular frame shape that may enclose the edge of the backlight unit 130, and may also be coupled to the top cover 160.

A power supply PCB 171, to supply external power to the liquid crystal panel 110 and the backlight unit 130, and a signal conversion PCB 172, to convert an external data signal may be separately provided. The power supply PCB 171 and the signal conversion PCB 172 may be provided in the bracket 170. The bracket 170 may be positioned at a lower part of the bottom cover 150 to which the backlight unit 130 is coupled. A liquid crystal display 100 may include a front case 180 and a rear case 190 that encloses the bracket 170 and the coupled top cover 160 and bottom cover 150.

Figure 2:
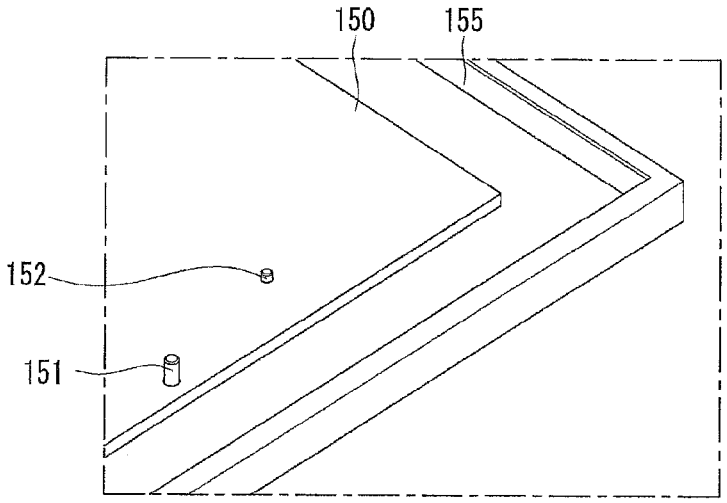
FIG. 2 is a partial perspective view illustrating a bottom cover of a liquid crystal display according to an embodiment.

FIG. 2 is a partial perspective view illustrating a bottom cover of a liquid crystal display according to an embodiment. Referring to FIG. 2, the bottom cover 150 may comprise at least one first protruding portion 151 and at least one second protruding portion 152. The first protruding portion 151 and the second protruding portion 152 of the bottom cover 150 may protrude upward from a surface of the bottom cover 150. The first protruding portion 151 may be a post that has a sufficient height to couple an LED assembly, a reflector, and a light guide plate. The second protruding portion 152 may be a peg that has a lower height relative to the first protruding portion 151, and may be coupled to the LED assembly and positioned below the reflector 120.

The first protruding portion 151 and the second protruding portion 152 may have a pillar shape. A lateral cross-section of the protruding portions 151 and 152 may be a polygon, for example, a circle, a triangle, a quadrangle, or any other appropriate shape that may couple the LED assembly, the reflector, and the light guiding plate.

The first protruding portion 151 may be positioned at a central part of one side surface of the bottom cover 150. When the LED assembly is mounted in a front surface of the bottom cover 150, the first protruding portion 151 may be positioned a predescribed distance from the side surface of the bottom cover 150 such that it does not contact an LED light source. A separation distance of the first protruding portion 151 and the side surface of the bottom cover 150 is not limited, and may be any distance in which the protruding portion 151 does not contact the LED light source. The second protruding portion 152 may be adjacently disposed at one side surface of the bottom cover 150 and may be positioned at one side edge of the support 123 of the LED assembly 120.

Figure 3:
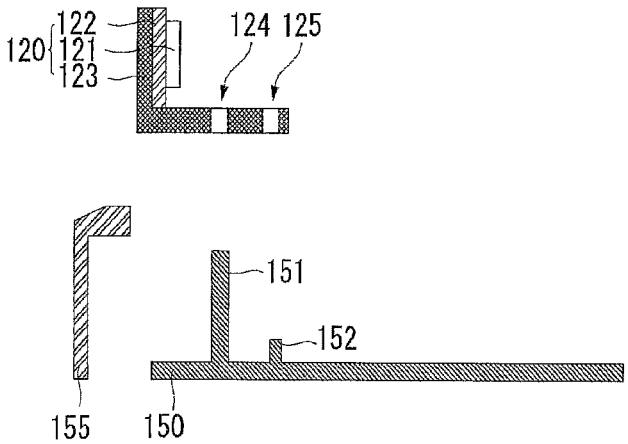
FIG. 3 is a cross-sectional view illustrating an LED assembly and a bottom cover of a liquid crystal display according to an embodiment.
Figure 4:
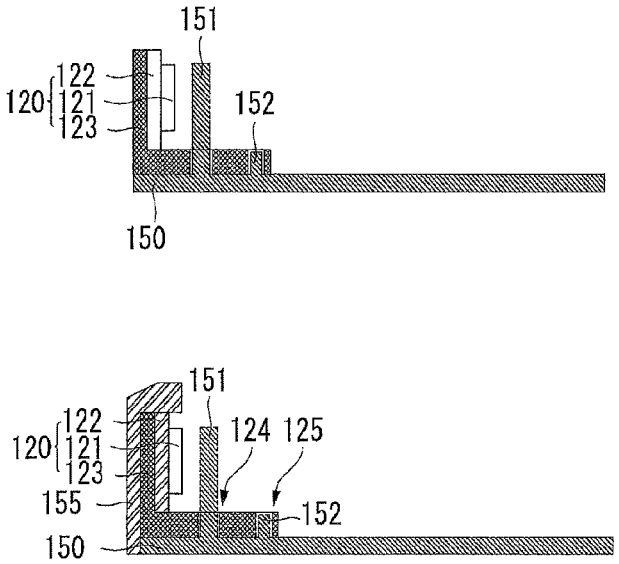
FIG. 4 is a cross-sectional view illustrating an LED assembly coupled to a bottom cover.
Figure 5:
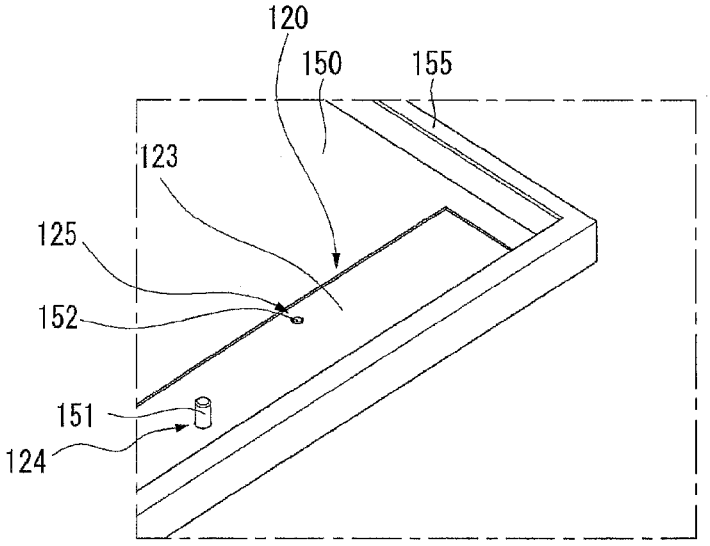
FIGS. 5 and 6 are perspective views illustrating an LED assembly coupled to a bottom cover.
Figure 6:
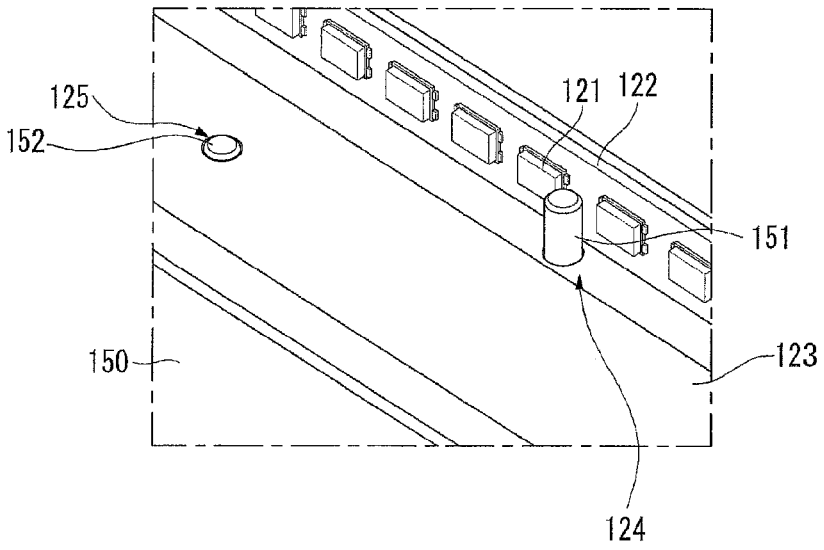
Figure 7:
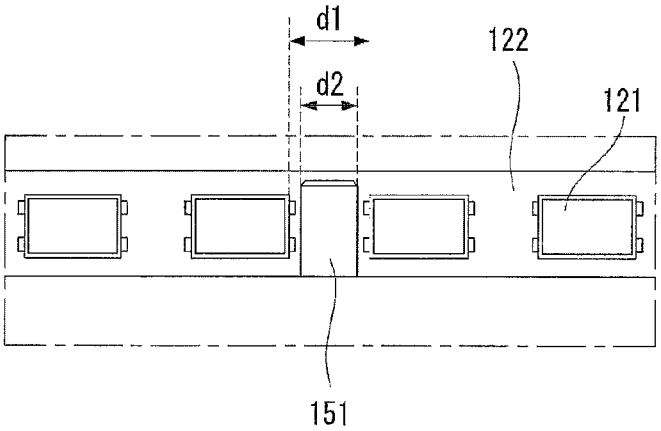
FIG. 7 is a cross-sectional view illustrating an LED assembly coupled to a bottom cover.

FIG. 3 is a cross-sectional view illustrating an LED assembly and a bottom cover in a liquid crystal display according to an embodiment, FIG. 4 is a cross-sectional view illustrating an LED assembly coupled to a bottom cover, FIGS. 5 and 6 are perspective views illustrating an LED assembly coupled to a bottom cover, and FIG. 7 is another cross-sectional view illustrating an LED assembly coupled to a bottom cover.

Referring to FIG. 3, the LED assembly 120 may include a plurality of LED light sources 121 separated by a predetermined gap, a substrate 122 on which the plurality of LED light sources 121 may be mounted, and a support 123 on which the substrate 122 may be mounted. The LED light source 121 may produce white light. The LED light source 121 may be a top view type for emitting light to the top of the LED light source 121 opposite to the light guiding plate, or a side view type for emitting light to a side surface of the LED light source 121, but is not limited thereto.

Although not shown in the drawings, the substrate 122 may have a plurality of wiring patterns connected to the LED light source 121 to apply an operation current to the LED light source 121. The support 123 may couple and support the substrate 122, including the LED light source 121 mounted thereon, to the bottom cover 150. The support 123 of the LED assembly 120 may have an "L" shape cross-section, including a vertical side surface 126 on the vertical portion and a top surface 127 on the horizontal portion. The LED assembly 120 may also comprise at least one first hole 124 and second hole 125 in the support 123 that may couple to the first protruding portion 151 and the second protruding portion 152 of the bottom cover 150. Here, the first hole 124 may be coupled to the first protruding portion 151 of the bottom cover 150, and the second hole 125 may be coupled to the second protruding portion 152 of the bottom cover 150. Moreover, the side cover 155 may be coupled to the bottom cover 150.

Referring to FIGS. 4 to 6, the LED assembly 120 may be coupled to the bottom cover 150. The first protruding portion 151 of the bottom cover 150 may be coupled to the first hole 124 provided in the support 123 of the LED assembly 120, and the second protruding portion 152 of the bottom cover 150 may be coupled to the second hole 125 of the support 123. Moreover, the side cover 155 may be coupled to the bottom cover 150.

Here, the first hole 124 provided in the support 123 of the LED assembly 120 may be positioned to correspond to the first protruding portion 151 of the bottom cover 150. For example, the first hole 124 may be disposed adjacent to one side surface of the support 123 corresponding to the first protruding portion 151 of the bottom cover 150, and laterally positioned at a central part of the one side surface. Further, the second hole 125 may be provided on the support 123 of the LED assembly 120 to correspond to the second protruding portion 152 of the bottom cover 150. For example, the second hole 125 may be positioned adjacent to an edge of the other side surface of the support 123 that is further away from the LED assembly 120, for example, adjacent to the edge of the horizontal portion of the support 123.

Still referring to FIGS. 4-6, the first protruding portion 151 of the bottom cover 150 may protrude upward through the first hole 124 of the support 123. For example, the first protruding portion 151 may have a height sufficient to support the reflector 128 and the light guiding plate 131. Further, the second protruding portion 152 of the bottom cover 150 may be positioned not to protrude through the top surface of the support 123 when inserted into the second hole 125 of the support 123. For example, in order to prevent contact with the reflector 128 that is to be coupled, an upper side surface, or top surface, of the second protruding portion 152 may be positioned lower than the top surface of the support 123. Alternatively, the upper side surface of the second protruding portion 152 may be positioned on the same line as, or co-planar with, the top surface of the horizontal portion of support 123.

Referring to FIG. 7, the LED light sources 121 arranged on the substrate 122 may be separated by a predetermined gap. Here, the LED light source 121 may be positioned outside an area corresponding to the first protruding portion 151 of the bottom cover 150. For example, light emitted from the LED light source 121 may be disturbed or obstructed due to the first protruding portion 151 positioned between the LED light source 121 and the light guiding plate. When the LED light source 121 is positioned at an area corresponding to the first protruding portion 151, light emitted from the LED light source 121 may be reflected and scattered by the first protruding portion 151. Thus, one surface of the first protruding portion 151 facing the LED light source 121 may have a high luminance, and an opposite surface thereof may have a relatively low luminance resulting in lower light source efficiency.

In order to reduce such a difference in luminance, the LED light source 121 may be disposed away from an area corresponding to the first protruding portion 151. For example, the first protruding portion 151 may be positioned between the LED light sources 121. Here, a gap d1 between the LED light sources 121 corresponding to the first protruding portion 151 maybe equal to or larger than a width d2 of the first protruding portion 151. Therefore, light emitted from the LED light source 121 is not reflected or blocked by the first protruding portion 151 and may advance to the light guide plate, thereby reducing a luminance difference caused by the first protruding portion 151.

Figure 8:
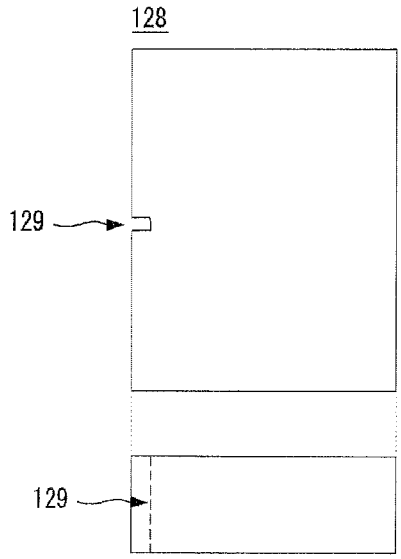
FIG. 8 is a top plan view and a cross-sectional view illustrating a reflector of the liquid crystal display according to an embodiment.
Figure 9:
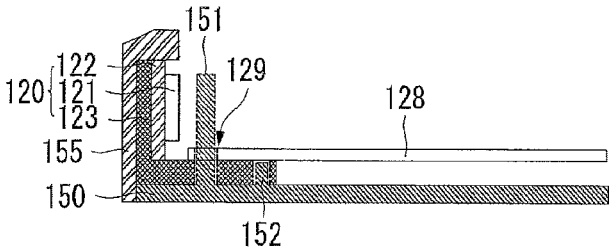
FIG. 9 is a cross-sectional view illustrating a reflector coupled to a bottom cover.
Figure 10:
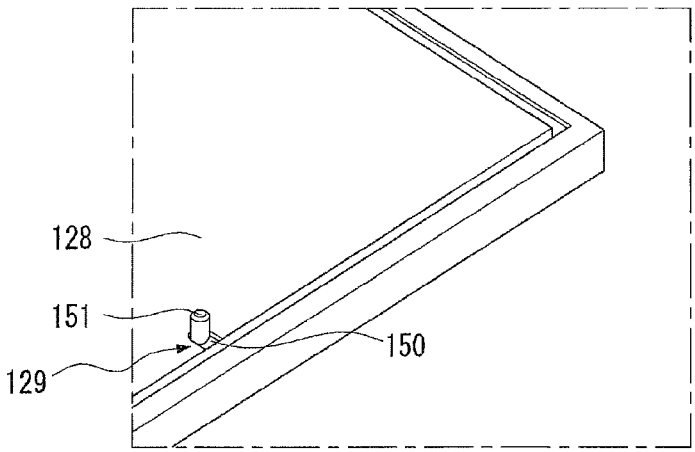
FIG. 10 is a partial perspective view illustrating the reflector coupled to a bottom cover.

FIG. 8 is a top plan view and a cross-sectional view illustrating a reflector according to an embodiment, and FIGS. 9 and 10 are a cross-sectional view and a perspective view illustrating a reflector coupled to a bottom cover. Referring to FIG. 8, a reflector 128 according to this embodiment may include at least one second concave portion 129 at one side surface thereof. The second concave portion 129 of the reflector 128 may have a shape concavely depressed or recessed from one side surface of the reflector 128 towards a central part of the reflector 128. The second concave portion 129 of the reflector 128 may have a size in which the reflector 128 does not move once it is coupled to the first protruding portion 151 of the bottom cover 150. For example, a size of the second concave portion 129 may be equal to or larger than a width of the first protruding portion 151, but sufficient to fix the reflector 128 to the bottom cover 150.

Referring to FIGS. 9 and 10, the second concave portion 129 may be coupled to the first protruding portion 151 of the bottom cover 150 to couple and support the reflector 128 to the bottom cover 150. The first protruding portion 151 may protrude upward, through the second concave portion 129 of the reflector 128, and the second protruding portion 152 of the bottom cover 150 may be positioned to prevent contact with the reflector 128. Further, referring to FIG. 9, the reflector 128 may be positioned on the support 123 at a lower part of the LED light source 121 to prevent blocking light emitted from the LED light source 121.

Figure 11:
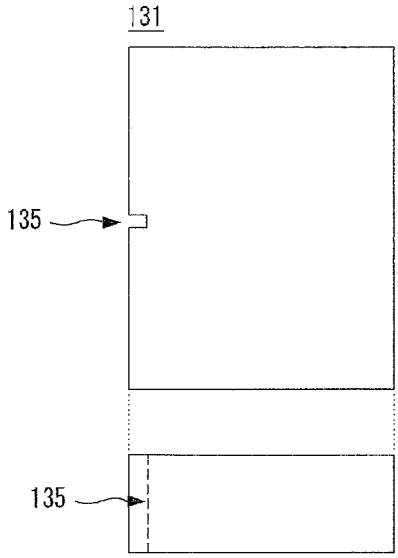
FIG. 11 is a top plan view and a cross-sectional view illustrating a light guiding plate of the liquid crystal display according to an embodiment.
Figure 12:
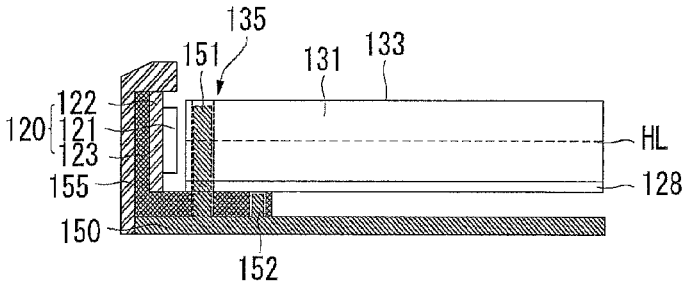
FIGS. 12 to 13 are cross-sectional views illustrating a light guiding plate coupled to a bottom cover.
Figure 13:
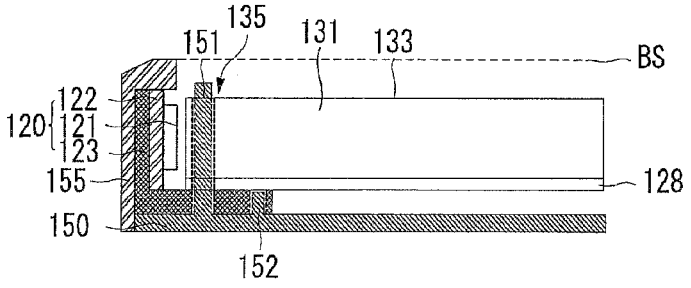
Figure 14:
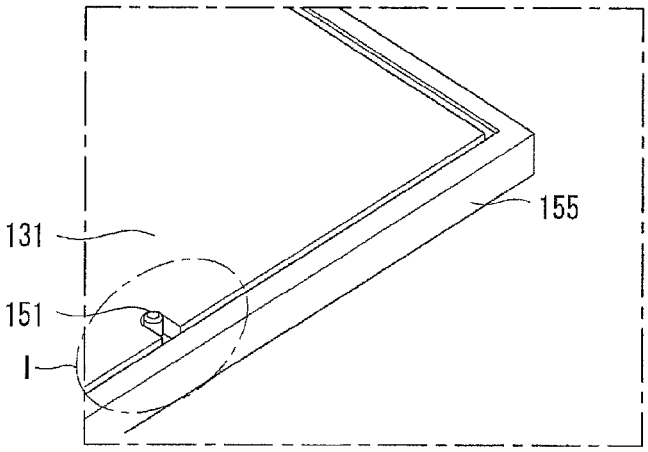
FIG. 14 is a partial perspective view illustrating a light guiding plate coupled to a bottom cover.

FIG. 11 is a top plan view and a cross-sectional view illustrating a light guiding plate according to an embodiment, and FIGS. 12 to 14 are cross-sectional views and a perspective view illustrating a light guiding plate coupled to a bottom cover. Referring to FIG. 11, a light guiding plate 131 according to this embodiment may include at least one first concave portion 135 at a side surface thereof. The first concave portion 135 of the light guiding plate 131 may have a shape concavely depressed or recessed from one side surface of the light guiding plate 131 to a central part of the light guiding plate 131. The first concave portion 135 of the light guiding plate 131 may have a size in which the light guiding plate 131 does not move once it is coupled to the first protruding portion 151 of the bottom cover 150. For example, a size of the first concave portion 135 may be equal to or larger than that of the first protruding portion 151.

Referring to FIGS. 12 to 14, the light guiding plate 131 may comprise a light emitting plane 133 for emitting light applied from the LED light source 121, and the first concave portion 135 of the light guiding plate 131 may be coupled to the first protruding portion 151 of the bottom cover 150 to couple and support the light guiding plate 131 to the bottom cover 150.

For example, as shown in FIG. 12, the first protruding portion 151 may be disposed to not protrude beyond the light emitting plane 133 of the light guiding plate 131 when placed in the first concave portion 135 of the light guiding plate 131. Further, an upper side surface, or top surface, of the first protruding portion 151 may be positioned at the same height as the light emitting plane 133 of the light guiding plate 131, or may also be positioned lower than the light emitting plane 133 of the light guiding plate 131. Here, the upper side surface of the first protruding portion 131 may be positioned equal to or higher than a horizon line HL at a ½ point of a height of the light guiding plate 131. Therefore, the first protruding portion 151 may support the light guiding plate 131 so that the light guiding plate 131 is not moved or separated, thereby providing reliable coupling between the light guiding plate 131 and the first protruding portion 151.

In another example, as shown in FIG. 13, the first protruding portion 151 may be coupled to the light guiding plate 131 such that it protrudes upward, beyond the light emitting plane 133 of the light guiding plate 131, but below an upper surface BS of the side cover 155. This may prevent an optical sheet that may be positioned above the light guiding plate 131, from coming in contact with the light guiding plate 131, thereby preventing damage to the optical sheet. For example, a diffusion sheet, positioned at a lowest portion of an optical sheet, may be protected from the first protruding portion 151. Here, the first protruding portion 151 may protrude with a minimum margin upward, beyond the light emitting plane 133 of the light guiding plate 131. Further, the light guiding plate 131 may be positioned on the reflector 128, and may be positioned such that a side surface of the light guiding plate 131 may face and cover a light emitting surface of the LED light source 121 in order to receive all light emitted from the LED light source 121.

Figure 15:
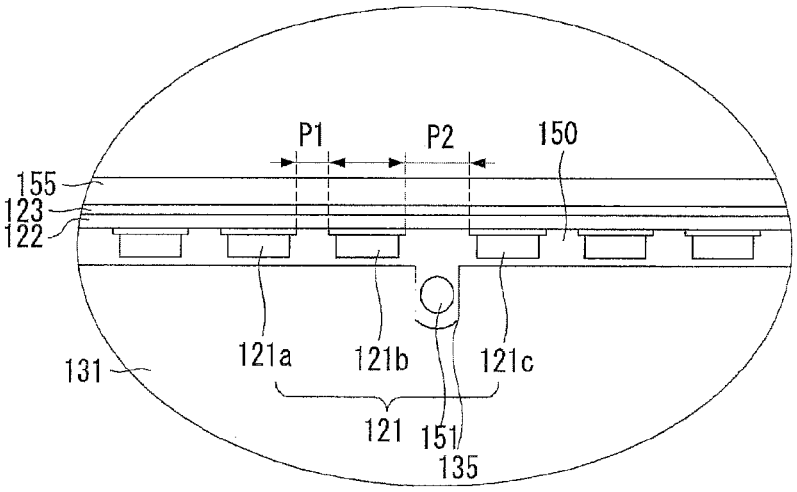
FIG. 15 is a top plan view illustrating an area I of FIG. 14.

FIG. 15 is a top plan view illustrating an area I of FIG. 14. Referring to FIG. 15, the first concave portion 135 of the light guiding plate 131 may be coupled to the first protruding portion 151 positioned on the bottom cover 150. At one side edge of the bottom cover 150, the substrate 122, on which a plurality of LED light sources 121 are disposed, may be coupled to the support 123. The plurality of LED light sources 121 may comprise a first LED light source 121a, a second LED light source 121b, and a third LED light source 121c. Here, a first gap P1 between the first LED light source 121a and the second LED light source 121b may be smaller than a second gap P2 between the second LED light source 121b and the third LED light source 121c.

For example, the second gap P2 between the second LED light source 121b and the third LED light source 121c corresponding to the first protruding portion 151 may be larger than the first gap P1 between the first LED light source 121a and the second LED light source 121b. This may reduce light emitted from the LED light source 121 from being disturbed by the first protruding portion 151 positioned between the LED light source 121 and the light guiding plate 131.

When the LED light source 121 is positioned at an area corresponding to the first protruding portion 151, light emitted from the LED light source 121 may be reflected and scattered by the first protruding portion 151, and thus, at a first surface of the first protruding portion 151 facing the LED light source 121, light may have a higher luminance than at an opposite surface thereof where light may have a relatively low luminance. Therefore, in order to prevent such a difference in luminance, the first gap P1 between the first LED light source 121a and the second LED light source 121b may be formed to be smaller than the second gap P2 between the second LED light source 121b and the third LED light source 121c. Further, the second gap P2, the first protruding portion 151, and the first concave portion 135 may be positioned to correspond to each other, for example, centered along the same line.

Figure 16:
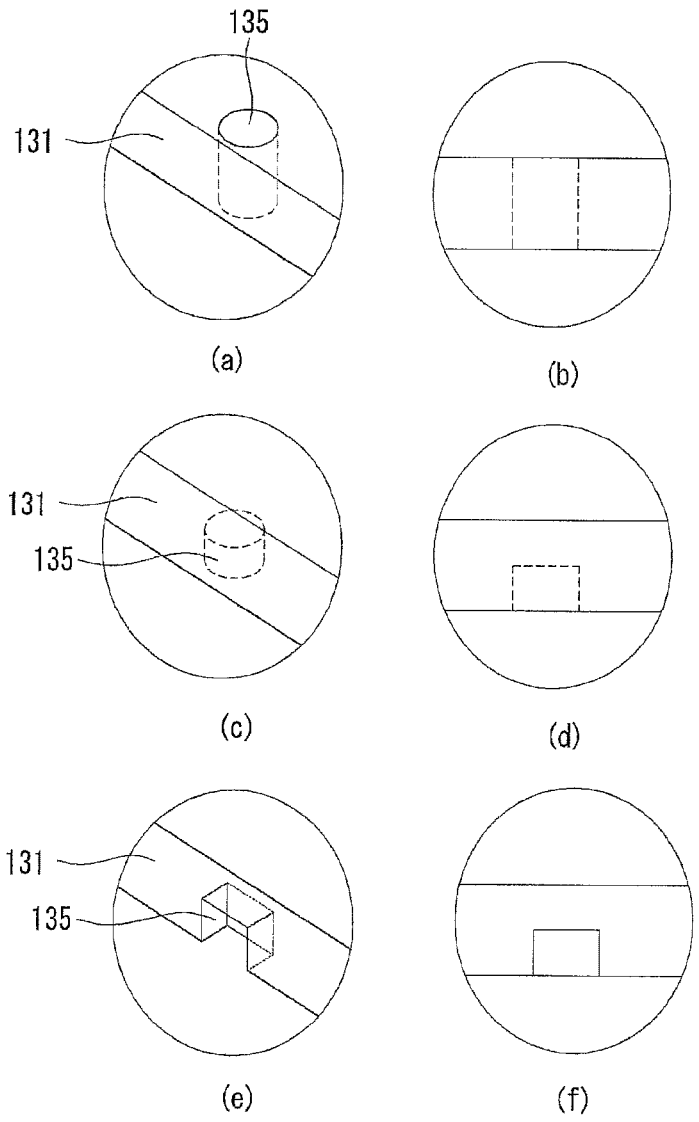
FIG. 16 is a partial perspective view illustrating shapes of concave portions on a light guiding plate and a reflector of the liquid crystal display according to an embodiment.

FIG. 16 illustrates a first and second concave portions of the reflector 128 or the light guiding plate 131. FIGS. 16(a), 16(c), and 16(e) are partial perspective views of the first and second concave portions. FIGS. 16(b), 16(d), and 16(f) are cross-sectional views corresponding to FIGS. 16(a), 16(c), and 16(e), respectively.

In the foregoing description, simply for ease of explanation, a shape of the first concave portion 135 of the light guiding plate 131 has been described as a shape concavely depressed, or recessed, at a central part of one side surface of the light guiding plate 131, and a shape of the second concave portion 129 of the reflector 128 has been described as a shape concavely depressed, or recessed, at a central part of one side surface of the reflector 128. However, the first concave portion 135 and the second concave portion 129 may be formed in other shapes or forms, for example, as a hole or slot. Referring to FIG. 16(a) and FIG. 16(b), which is a cross-sectional view of FIG. 16(a), the first concave portion 135 of the light guiding plate 131 may be formed in a hole shape. That is, a hole may be formed in a central part of one side surface of the light guiding plate 131. Likewise, the second concave portion of the reflector 128 may be formed in the same shape as that of the first concave portion 135 of the light guiding plate 131.

Further, referring to FIG. 16(c) and FIG. 16(d), which is a cross-sectional view of FIG. 16(c), the first concave portion 135 of the light guiding plate 131 may have a shape concavely depressed from a lower part of the light guiding plate 131 to a depth that may be one half the thickness of the light guiding plate 131. Referring to FIG. 16(e) and FIG. 16(f), which is a cross-sectional view of FIG. 16(e), the first concave portion 135 of the light guiding plate 131 may have a shape in which a lower side surface of the light guiding plate 131 may be concavely depressed to a depth that may be one half the thickness of the light guiding plate 131. In this embodiment, various shapes of the first and second concave portions are shown, but the first and second concave portions may have any other appropriate shape in which the light guiding plate 131 or the reflector 128 may be fixed to the first protruding portion 135.

According to an embodiment, when the LED assembly 120 is positioned at one side of the bottom cover 150, the LED assembly 120 may include a first protruding portion 151 and a second protruding portion 152 at one side edge of the bottom cover 150. The first protruding portion 151 and the second protruding portion 152 may couple and support the LED assembly 120, the reflector 128, and the light guiding plate 131. Thus, reliability of the LED assembly 120, the reflector 128, and the light guiding plate 131 coupled to the bottom cover 150 may be improved.

Figure 17:
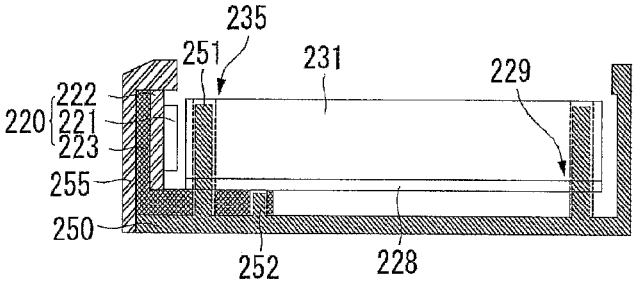
FIGS. 17 to 23 are cross-sectional views and perspective views illustrating a backlight unit according to another embodiment.

FIGS. 17 to 23 are cross-sectional views and perspective views illustrating a backlight unit according to another embodiment. Referring to FIG. 17, the bottom cover 250 may comprise a first protruding portion 251 positioned adjacent both a first side edge and an opposite side edge, and a second protruding portion 252 positioned adjacent one side edge at which the LED assembly 220 is positioned. Moreover, the side cover 255 may be coupled to the bottom cover 250.

The LED assembly 220 may be coupled to the bottom cover 250 at front surface of the bottom cover 250, and may comprise an LED light source 221, and a substrate 222 to which the LED light source 221 may be mounted, and a support 223 to which the substrate 222 may be mounted. A first hole 224 and a second hole 225 may be positioned on the support 223 corresponding to the first protruding portion 251 and the second protruding portion 252 of the bottom cover 250, respectively, to be coupled thereto.

Second concave portions 229 of the reflector 228 may be positioned adjacent each side edge of the reflector 228 corresponding to each of the first protruding portions 251 adjacent each side edge of the bottom cover 250, respectively, to be coupled thereto. First concave portions 235 of the light guiding plate 231 may be positioned adjacent each side edge of the light guide plate 231 corresponding to each of the first protruding portions 251 of the bottom cover 250, respectively, to be coupled thereto.

In an embodiment, the light guide plate 231 may include a first protruding portion 251 positioned at opposite side edges of the bottom cover 250 and a second protruding portion 252 positioned at one side edge at which the LED assembly 220 is positioned. The first protruding portions 251 and the second protruding portions 252 may couple and support the LED assembly 220, and may also couple and support the reflector 228 and the light guiding plate 231 at both sides. Thus, reliability of the LED assembly 220, the light guiding plate 231, and the reflector 228 coupled to the bottom cover 250 may be improved.

Figure 18:
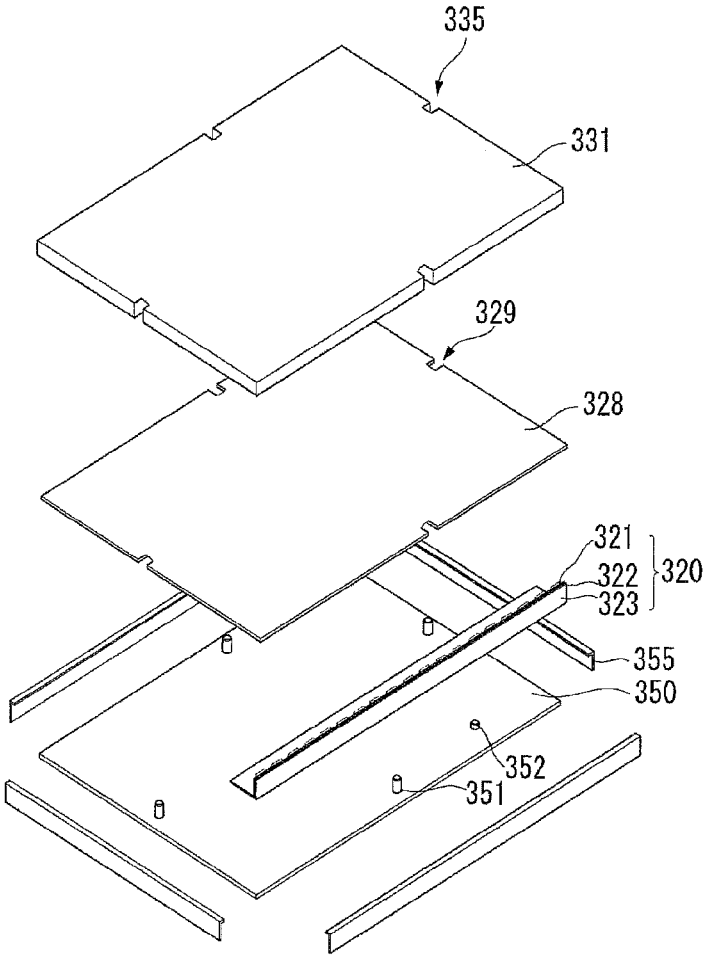

Referring to FIG. 18, a bottom cover 350 may include first protruding portions 351 positioned adjacent to each of four side edges of the bottom cover 350, and a second protruding portion 352 positioned adjacent to one side edge at which the LED assembly 320 is positioned. The LED assembly 320 may be coupled to the bottom cover 350 at front surface of the bottom cover 350, and may include an LED light source 321, a substrate 322 on which the LED light sources 321 may be mounted, and a support 323 on which the substrate 322 may be mounted. A first hole 324 and a second hole 325 may be positioned at the support 323 corresponding to a first protruding portion 351 and a second protruding portion 352 of the bottom cover 350, respectively, to be coupled thereto. Moreover, the side cover 355 may be coupled to the bottom cover 350.

Second concave portions 329 may be positioned at each of four side edges of a reflector 328 corresponding to each of the four first protruding portions 351 of the bottom cover 350, respectively. The reflector 328 may be mounted on the LED assembly 320 and the bottom cover 350 using the first protruding portions 351. First concave portions 335 may be positioned at each of the four side edges of the light guiding plate 331 corresponding to each of the four second concave portions 329 of the reflector 328. The light guide plate 331 may be positioned on the reflector 328 to be coupled to the bottom cover 350 using the first protruding portions 351 of the bottom cover 350.

In an embodiment, the light guide plate 331 may include first protruding portions 351 positioned at each of the four side edges of the bottom cover, and a second protruding portion 352 positioned at one side edge at which the LED assembly 320 is positioned. The first protruding portion 351 and the second protruding portion 352 may couple and support the LED assembly 320, and may further couple and support the reflector 328 and the light guiding plate 331 at the four sides. Thus, reliability of the LED assembly 320, the light guiding plate 331, and the reflector 328 coupled to the bottom cover 350 may be improved.

Figure 19:
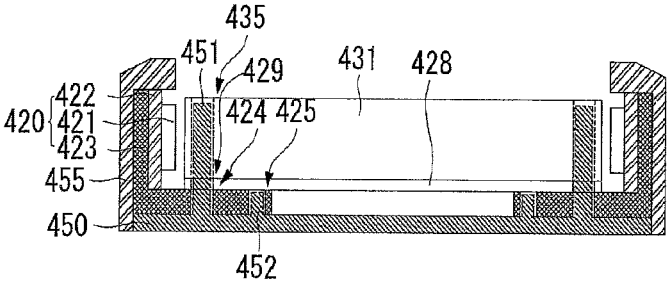

Referring to FIG. 19, in another embodiment, a bottom cover 450 may include a first protruding portion 451 and a second protruding portion 452 positioned adjacent to a first side edge and a second side edge that is opposite the first side edge. The LED assembly 420 may be coupled to the bottom cover 450 and positioned adjacent to each of a first and second side edges of the bottom cover 450, and may include an LED light source 421, a substrate 422 on which the LED light source may be mounted, and a support 423 on which the substrate 422 may be mounted. A first hole 424 and a second hole 425 may be positioned at the support 423 corresponding to the first protruding portion 451 and the second protruding portion 452 of the bottom cover 450, respectively, to be coupled thereto. Moreover, the side cover 455 may be coupled to the bottom cover 450.

Second concave portions 429 positioned adjacent to each of a first and second side edges of a reflector 428 may be formed in the reflector 428 to correspond to the first protruding portions 451. The reflector 428 may be coupled to the first protruding portions 451 of the bottom cover 450 to be positioned on the supports 423 and the bottom cover 450. First concave portions 435 positioned adjacent to each of a first and second side edges of the light guiding plate 431 may be formed in the light guiding plate 431 to correspond to the first protruding portions 451. The light guiding plate 431 may be coupled to the first protruding portions 451 of the bottom cover 450 to be positioned on the reflector 428.

As described above, when the LED assembly 420 is positioned at each of the first and second side edges of the bottom cover 450, the LED assembly 420 may include a first protruding portion 451 and a second protruding portion 452 positioned near each of the first and second side edges of the bottom cover 450. The first protruding portion 451 and the second protruding portion 452 may couple and support the LED assembly 420, the reflector 428, and the light guiding plate 431 at both sides corresponding to the protruding portions, thereby improving reliability of the LED assembly 420, the reflector 428, and the light guiding plate 431 coupled to the bottom cover 450.

Figure 20:
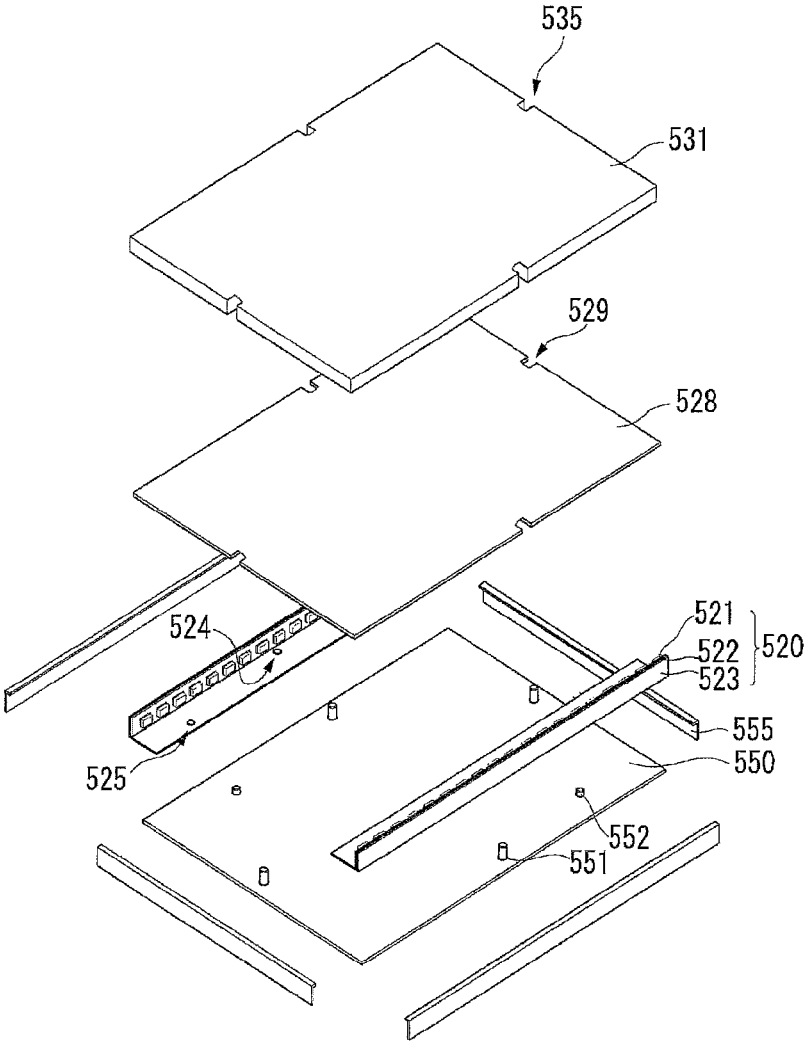

Further, referring to FIG. 20, a bottom cover 550 may comprise a first protruding portion 551 and a second protruding portion 552 positioned at each of four side edges. An LED assembly 520 may be coupled to the bottom cover 550 at each of a first and second side edges of the bottom cover 550, and may comprise an LED light source 521, a substrate 522 on which the LED light source 521 may be mounted, and a support 523 on which the substrate 522 may be mounted. Further, the side cover 555 may be coupled to the bottom cover 550.

A first hole 524 and a second hole 525 may be positioned on the support 523 to be coupled to the first protruding portion 551 and the second protruding portion 552, respectively, of the bottom cover 550. Second concave portions 529 may be positioned at each of four side edges of a reflector 528, and may be formed to correspond to the first protruding portions 551 of the bottom cover 550 such that the reflector 528 may be positioned on the support 523 and the bottom cover 550 by coupling to each of the first protruding portions 551, respectively, of the bottom cover 550. First concave portions 535 may be positioned at each of four side edges of a light guiding plate 531, and may be positioned at the light guiding plate 531 positioned on the reflector 528 to be coupled to the first protruding portions 551, respectively, of the bottom cover 550.

In this embodiment, the LED assembly 520 may be positioned at the first and second side edges of the bottom cover 550. The bottom cover 550 may include a second protruding portion 552 positioned adjacent to each of a first and second side edges at which the LED assembly 520 may be positioned such that the second protruding portion may couple and support the LED assembly 520. The bottom cover 550 may further include a first protruding portion 551 positioned adjacent to each of the four side edges of the bottom cover 550 to couple and support the reflector 528 and the light guiding plate 531 at each of the four sides, thereby improving reliability of the LED assembly 520, the reflector 528, and the light guiding plate 531 coupled to the bottom cover 550.

Figure 21:
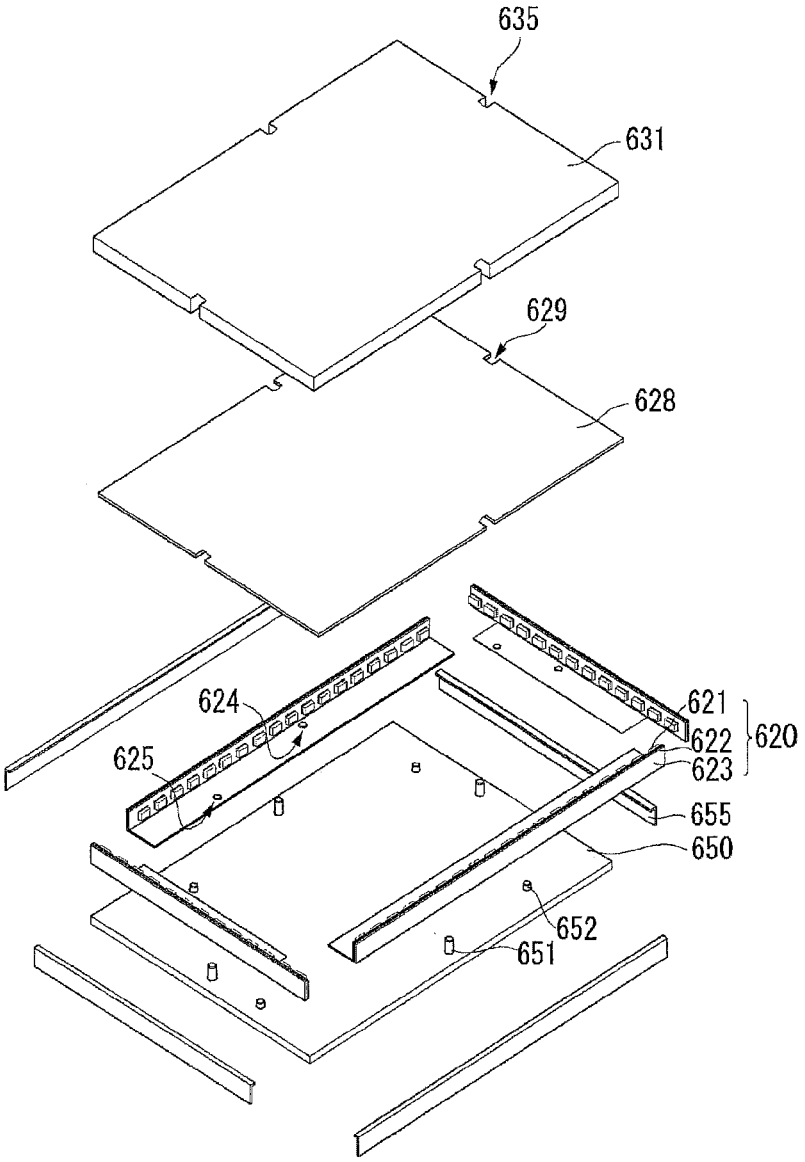

Referring to FIG. 21, in this embodiment, a bottom cover 650 may include a first protruding portion 651 and a second protruding portion 652 positioned adjacent to each of the four side edges. The LED assembly 620 may be coupled to the bottom cover 650 at each of the four side edges of the bottom cover 650, and may include a substrate 622 and a support 623 including an LED light source 621 mounted thereon. A first hole 624 and a second hole 625 may be positioned at the support 623 and may be coupled to the first protruding portion 651 and the second protruding portion 652 of the bottom cover 650, respectively. Moreover, the side cover 655 may be coupled to the bottom cover 650.

A second concave portion 629 may be positioned at each of the four side edges of a reflector 628, such that the reflector 628 may be positioned on the support 623 and the bottom cover 650 by coupling to each of the four first protruding portions 651, respectively, of the bottom cover 650. A first concave portion 635 may be positioned at each of four side edges of a light guiding plate 631 and may be coupled to each of the four corresponding first protruding portions 651 of the bottom cover 650.

In this embodiment, when the LED assembly 620 is positioned at each of the four side edges of the bottom cover 650, the LED assembly 620 may comprise second protruding portions 652 positioned adjacent each of the four side edges of the bottom cover 650 having the LED assembly positioned thereon such that the second protruding portions 652 may couple and support the LED assembly 620. The LED assembly 620 may also include first protruding portions 651 positioned adjacent each of the four side edges of the bottom cover 650 such that the first protruding portions 651 may couple and support the reflector 628 and the light guiding plate 631 at each of the respective four sides, thereby improving reliability of the LED assembly 620, the reflector 628, and the light guiding plate 631 coupled to the bottom cover 650.

In the foregoing embodiments, the first protruding portion of the bottom cover may be positioned near a central part, or a midpoint, of at least one side of the bottom cover 650. Further, the first concave portion of the light guiding plate may be positioned at a central part, or a midpoint, of at least one side of the light guiding plate. The second concave portion of the reflector may likewise be positioned at the central part, or a midpoint, of at least one side of the reflector.

Figure 22:
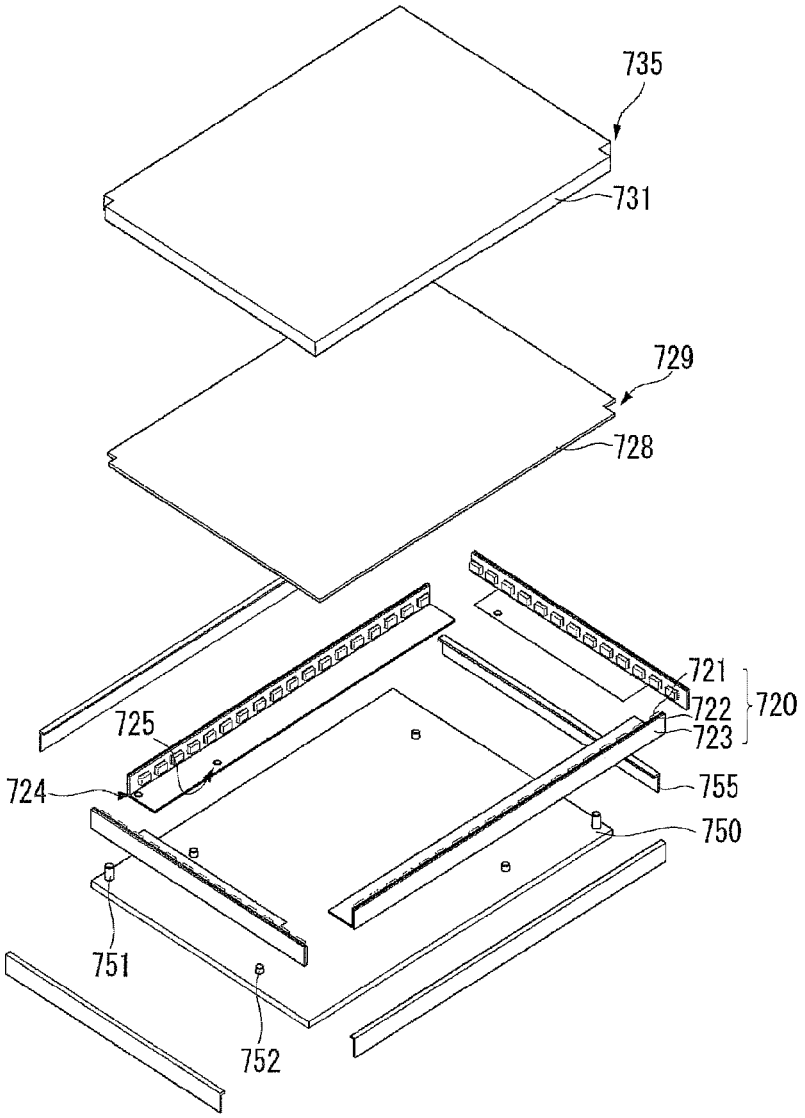

Referring to FIG. 22, in another embodiment, a bottom cover 750 may include first protruding portions 751 positioned at a first and second corner opposite to each other, and second protruding portions 752 may be positioned near each of the four side edges of the bottom cover 750. The LED assemblies 720 may be coupled to the bottom cover 750, and positioned at each of four side edges of the bottom cover 750. Each LED assembly 720 may include an LED light source 721, a substrate 722, and a support 723. A first hole 724 and a second hole 725 may be positioned at the support 723 to be coupled to the first protruding portion 751 and the second protruding portion 752, respectively, of the bottom cover 750. Moreover, the side cover 755 may be coupled to the bottom cover 750.

Second concave portions 729 positioned at each of both side edges opposite to a reflector 728 are formed in the reflector 728 positioned on the support 723 and the bottom cover 750 to be coupled to the first protruding portions 751, respectively, of the bottom cover 750. First concave portions 735 may be positioned at each of the first and second side edges and may be coupled to corresponding first protruding portions 751 of the bottom cover 750. In this embodiment, by providing each concave portion 735 of the light guiding plate 731 and the reflector 728 at opposite corners to correspond to the first protruding portion 751 provided at opposite corners of the bottom cover 750, reliability of the reflector 728 and the light guiding plate 731 coupled to the bottom cover 750 may be improved.

Figure 23:
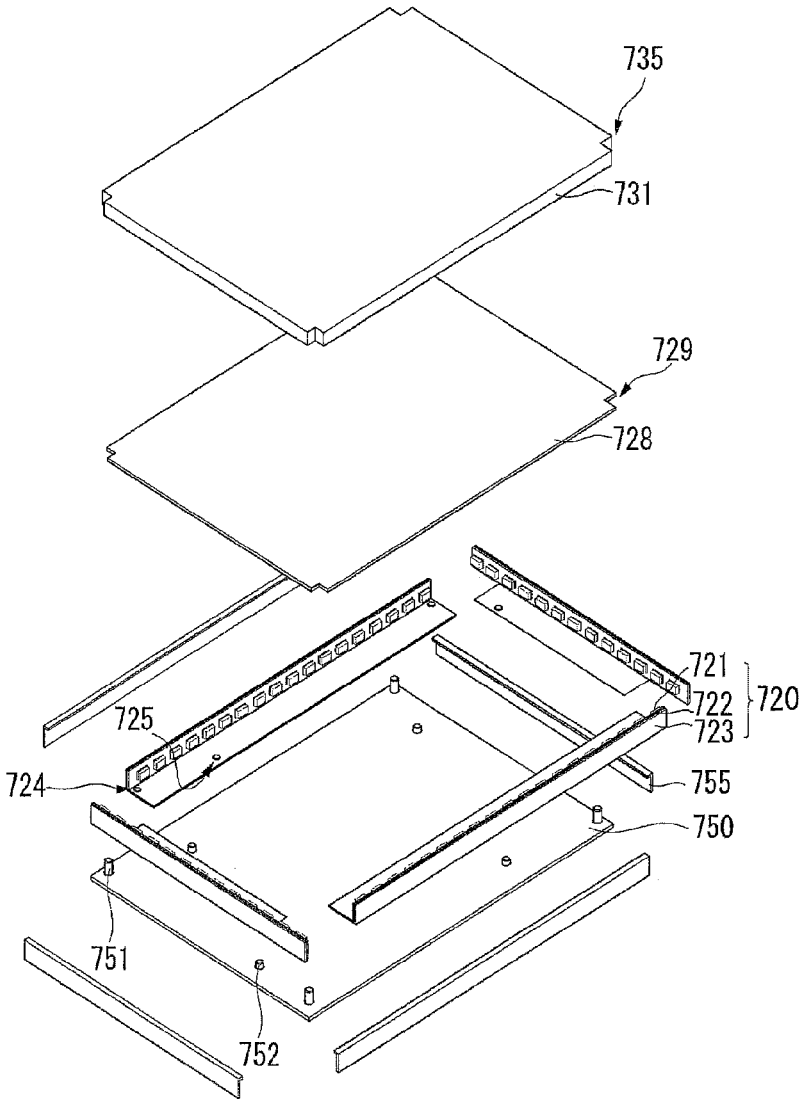

Further, as shown in FIG. 23, the bottom cover 750 may comprise first protruding portions 751 positioned near each of four corners and second protruding portions 752 may be positioned near the four side corners. Second concave portions 729 may be positioned at each of four side corners of the reflector 728 that may be positioned on the support 723 and the bottom cover 750, and each of the second concave portions 729 maybe coupled to each corresponding first protruding portions 751 of the bottom cover 750. First concave portions 735 may be positioned at each of four side corners of the light guiding plate 731 that may be positioned on the reflector 728, and each of the first concave portions 735 may be coupled to each corresponding first protruding portions 751 of the bottom cover 750. In this embodiment, by providing each concave portion of the light guiding plate 731 and the reflector 728 at each of the four side corners to correspond to the first protruding portion 751 provided in each of the four side corners of the bottom cover 750, reliability of the reflector 728 and the light guiding plate 731 coupled to the bottom cover 750 may be improved.

Figure 24:
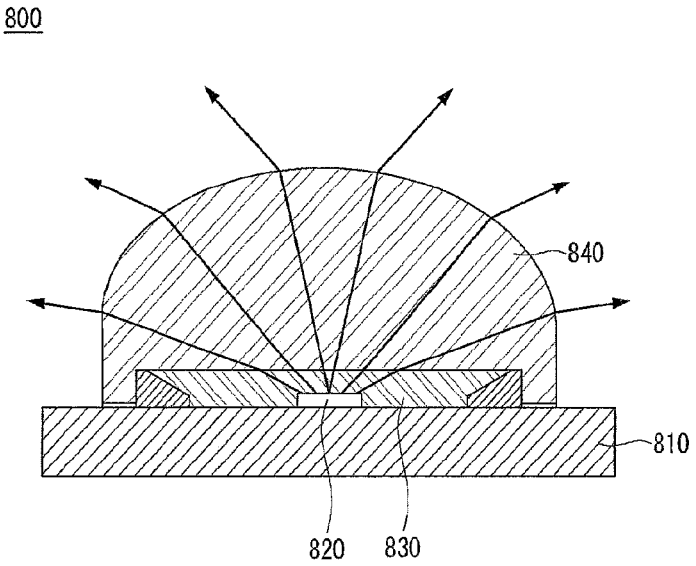
FIGS. 24 to 26 illustrate an LED light source of a backlight unit.
Figure 25:
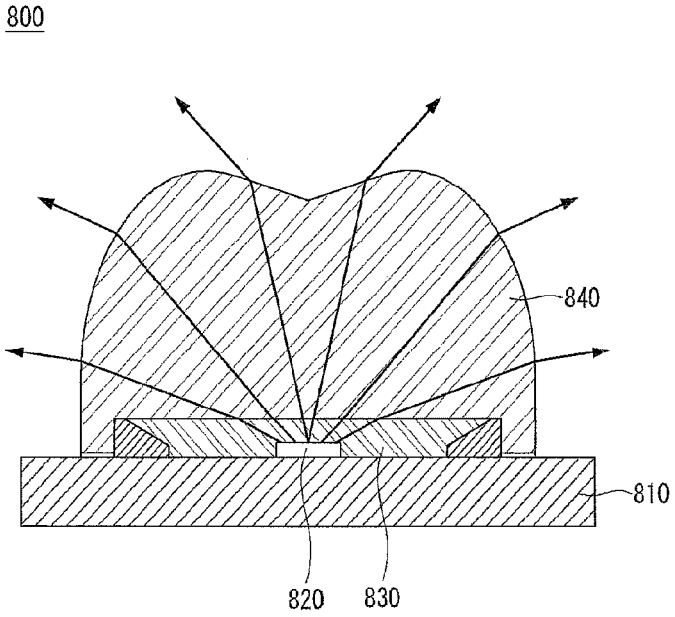
Figure 26:
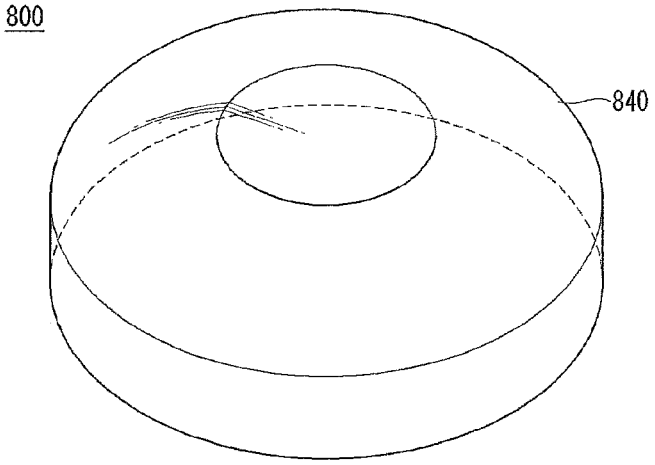

FIGS. 24 to 26 illustrate an LED light source of various shapes which may be used. Referring to FIG. 24, an LED light source 800 may comprise an LED body 810, a light emitting element 820 which may be positioned on the LED body 810, a filling material 830 that may cover the light emitting element 820, and a lens 840 which may be provided on the LED body 810.

The LED body 810 may form a body of the LED light source 800 and may be made of a conductive material, for example, aluminum or other appropriate materials, to function as a heat sink. The light emitting element 820 may be formed of a semiconductor material having an energy difference between valence band electrons and conduction band electrons, and may emit red color light, green color light, or blue color light.

The filling material 830 may cover the light emitting element 820 and may be made of an epoxy, silicone gel, or other appropriate materials. A specific color phosphor may be mixed thereto to vary the color of the light emitted. For example, the LED light source 800 having a light emitting element 820 which emits blue color light may be configured to emit white light using various combinations of the light emitting element 820 and various color phosphors. The light emitting element 820 which emits blue color light may be combined with phosphor that may absorb some of the blue color light to emit yellow color light. Further, mixing phosphor that absorbs yellow color light may provide a white light emitting element for emitting white color light.

A lens 840 which may cover an upper part of the LED body 810 may be formed in a hemispherical shape, as shown in FIG. 24. This may prevent light emitted from the light emitting element 820 from focusing on a specific portion within the light guiding plate and may improve diffusion characteristics of light emitted from the light emitting element 820. Further, as shown in FIG. 25, a central portion of the lens 840 may be formed in a pointed groove shape and, as shown in FIG. 26, a central portion of the lens 840 may be formed in a hemispherical groove shape. However, lens 840 of the LED light source 800 may be formed in various shapes and are not limited thereto. Further, an LED light source 800 may have a structure in which the lens 840 is not used.

Figure 27:
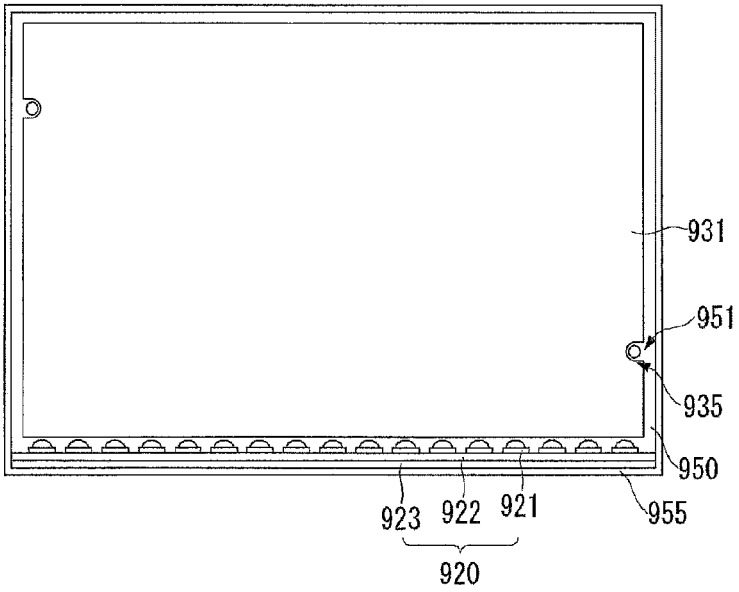
FIGS. 27 and 28 are top plan views illustrating a backlight unit according to another embodiment.
Figure 28:
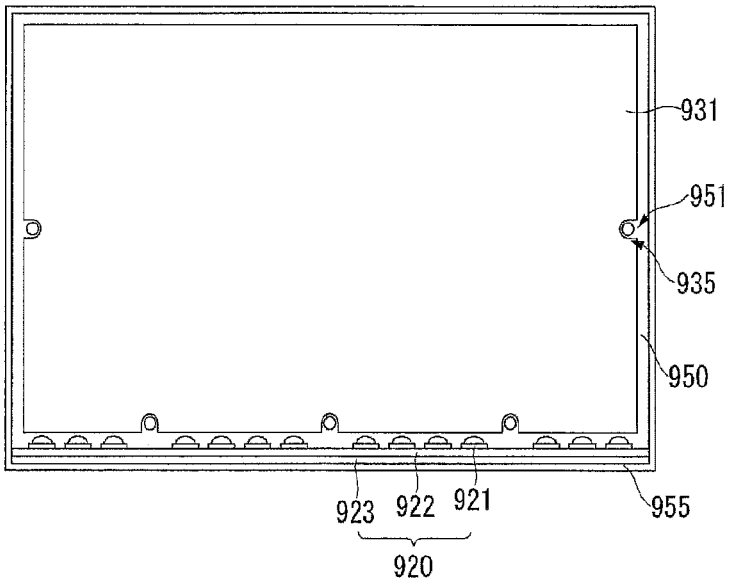

FIGS. 27 and 28 are top plan views illustrating a backlight unit according to another embodiment. Referring to FIG. 27, a bottom cover 950 of this embodiment may include first protruding portions 951 positioned at each of an upper part of the left side and a lower part of the right side. For example, the first protruding portions 951 may be positioned to have differing vertical positions on the bottom cover 950.

The first concave portions 935 may be positioned at an upper part of the left side and a lower part of the right side of the light guiding plate 931, and may be coupled to the corresponding first protruding portions 951 of the bottom cover 950. For example, the first concave portion 935 may be provided at a same position that corresponds to the position of the first protruding portion 951.

The LED assembly 920 may be coupled to the bottom cover 950 and may be positioned at one side edge of the bottom cover 950. The LED assembly 920 may include an LED light source 921, and a substrate 922 and a support 923 in which the LED light source 921 may be mounted. The lens 840 described in FIGS. 24 to 26 may be provided in the LED light source 921 of the LED assembly 920.

As shown in FIG. 27, when the liquid crystal display is assembled and positioned to stand or mounted vertically, the side of the bottom cover 950 having the LED assembly 920 mounted thereon may be positioned at the bottom of the display. Therefore, when the liquid crystal display is assembled and positioned for use, the first protruding portions 951 and the first concave portions 935 are coupled to each other to fix the light guiding plate 931 in place, thereby preventing the light guiding plate 931 from contacting the LED light source 921 positioned below.

Further, referring to FIG. 28, the first protruding portions 951 may be positioned at the centers of the left side and the right side of the bottom cover 950. A plurality of first protruding portions 951 may also be positioned at the lower side of the bottom cover 950. First concave portions 935 of the light guiding plate 931 may be positioned to correspond to the first protruding portions 951 of the bottom cover 950 at the centers of the left side and the right side and at the lower side of the light guiding plate 931. The first concave portions 935 may then be coupled to the first protruding portions 951 to fix the light guiding plate 931 to the bottom cover 950. Further, the side cover 955 may be coupled to the bottom cover 950.

The LED assembly 920 may be coupled to the bottom cover 950, and may be positioned at a lower side edge of the bottom cover 950. For example, as described above, when the liquid crystal display is completely assembled and positioned for use, for example, mounted vertically or placed to stand, the LED assembly 920 may be positioned on a side edge of the bottom cover 950 at the bottom of the liquid crystal display. The LED assembly 920 may be protected from damage caused by contact with the light guiding plate 931 by fixing the light guiding plate 931 to the bottom cover 950 using the first protruding portions 951 and the first concave portions 935.

Further, as described above, the first protruding portion 951 may reflect or scatter light emitted from an LED light source 921, creating a difference in luminance. Therefore, the first protruding portion 951 may be positioned in an area at which a gap is formed between the LED light sources 921 that is larger than that in other areas. Positioning the first protruding portion 951 in a gap between LED light sources 921 may reduce interference by the first protruding portion 951 and may prevent a difference in luminance from occurring on the light guiding plate 931.

Figure 29:
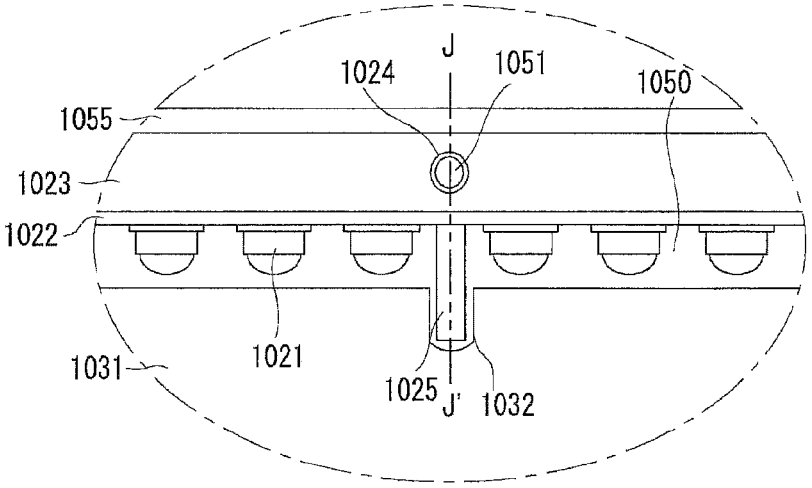
FIG. 29 is a top plan view illustrating a backlight unit according to another embodiment.

In a backlight unit according to another embodiment, a third protruding portion may be provided in an LED unit assembly. FIG. 29 is a top plan view illustrating the backlight unit according to this embodiment, FIG. 30 is a cross-sectional view illustrating a backlight unit taken along line J-J' of FIG. 29, and FIG. 31 is a top plan view illustrating a front surface of the backlight unit.

Figure 30:
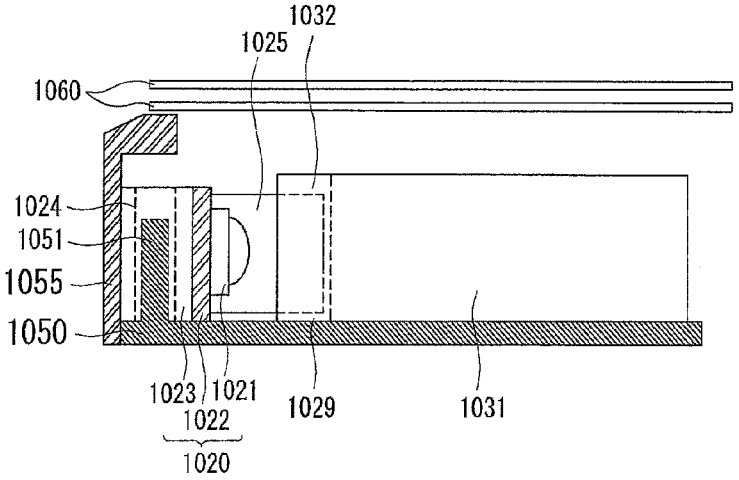
FIG. 30 is a cross-sectional view illustrating a backlight unit taken along line J-J' of FIG. 29.
Figure 31:
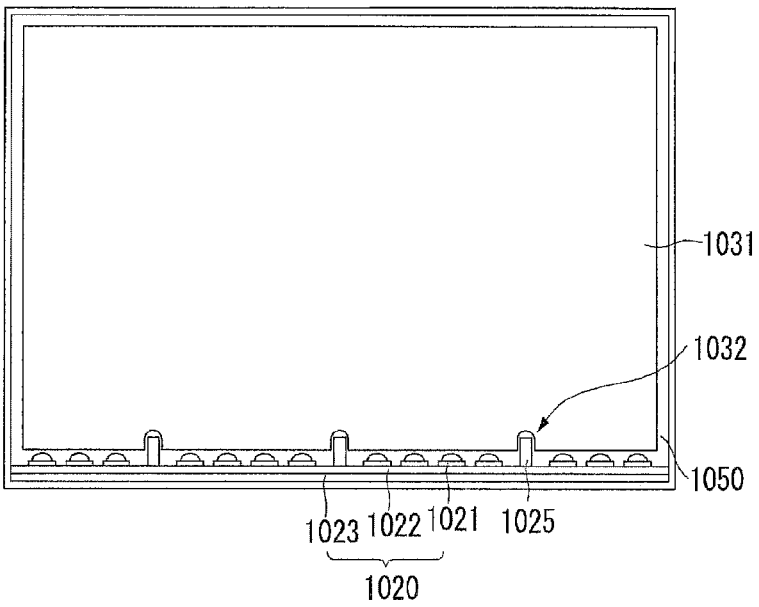
FIG. 31 is a top plan view illustrating a front surface of a backlight unit according to an embodiment.

Referring to FIGS. 29 and 30, an LED assembly 1020 may include a plurality of LED light sources 1021 which may be separated by a predetermined gap, a substrate 1022 on which the plurality of LED light sources 1021 may be mounted, and a support 1023 on which the substrate 1022 may be mounted. The support 1023 of the LED assembly 1020 may be formed in a bar shape that does not protrude at a lower portion towards the LED light source 1021 or the light guiding plate 1031. For example, the support 1023 is not shaped in an "L" shape as in other embodiments previously disclosed.

The LED assembly 1020 may be provided on a side edge of the bottom cover 1050. A first protruding portion 1051 may be provided on the bottom cover 1050, and may couple the LED assembly 1020 to the bottom cover 1050. The LED assembly 1020 may include at least one first hole 1024 in the support 1023 that may be coupled to the first protruding portion 1051 of the bottom cover 1050. Here, the first hole 1024 provided on the support 1023 of the LED assembly 1020 may be positioned to correspond to the first protruding portion 1051 of the bottom cover 1050. Moreover, the side cover 1055 may be coupled to the bottom cover 1050.

Further, in the LED assembly 1020, a third protruding portion 1025 may be provided on the substrate 1022. The third protruding portion 1025 may protrude from the substrate 1022 in a direction in which light is emitted from the LED light source 1021, and may be positioned in between the LED light sources 1021. For example, the third protruding portion 1025 may protrude horizontally from the side edge of the bottom cover 1050 towards the light guide plate 1031.

The light guiding plate 1031 may be provided on the bottom cover 1050. At least one first concave portion 1032 may be formed on one side surface of the light guide plate 1031. The first concave portion 1032 of the light guiding plate 1031 may be formed in a shape concavely depressed, or recessed, from the one side surface of the light guiding plate 1031 towards a central part of the light guiding plate 1031. The first concave portion 1032 of the light guiding plate 1031 may be formed to be a size such that the light guiding plate 1031 may be fixed relative to the LED assembly 1020 when the third protruding portion 1025 is coupled to the first concave portion 1032. The third protruding portion 1025 of the LED assembly 1020 may be coupled to the first concave portion 1032 of the light guiding plate 1031 to support the light guiding plate 1031, and to prevent the light guiding plate 1031 from contacting with the LED light source 1021.

Referring to FIG. 31, the LED assembly 1020 may be coupled to the bottom cover 1050 and may be positioned at one side edge of the bottom cover 1050. The LED assembly 1020 may include an LED light source 1021, and a substrate 1022 and a support 1023 on which the LED light source 1021 may be mounted. A plurality of third protruding portions 1025 may be provided on the substrate 1022.

A plurality of first concave portions 1032 may be positioned at a lower side of the light guiding plate 1031 and may be coupled to each corresponding first protruding portions 1025 of the LED assembly 1020. The light guiding plate 1031 may be fixed relative to the LED assembly 1020 and the bottom cover 1050 when coupled to the first protruding portion 1025.

When the liquid crystal display is assembled and positioned vertically, the side of the bottom cover 1050 on which the LED assembly 1020 is mounted may be positioned at the bottom of the liquid crystal display. Therefore, when the liquid crystal display is positioned vertically, the LED assembly 1020 may be protected from possible damage caused by contact with the light guiding plate 1031. The LED assembly 1020 is protected by fixing the light guiding plate 931 to the bottom cover 950 using the first protruding portions 1025 and the first concave portions 1032.

Referring now to FIG. 30, a plurality of optical sheets 1060 may be positioned at an upper part of the side cover 1055. In more detail, the optical sheet 1060 may be positioned on the side cover 1055, above the light guiding plate 1031 and the LED assembly 1020. Further, the optical sheet 1060 may be fixed to the side cover 1055. Although not shown in FIG. 30, a plurality of holes may be formed at outside edges of the optical sheet 1060, and a plurality of corresponding protruding portions may be formed at the upper side of the side cover 1055. The hole of the optical sheet 1060 may be coupled to the protruding portion of the side cover 1055 to fix the optical sheet 1060 on the side cover 1055.

Figure 32:
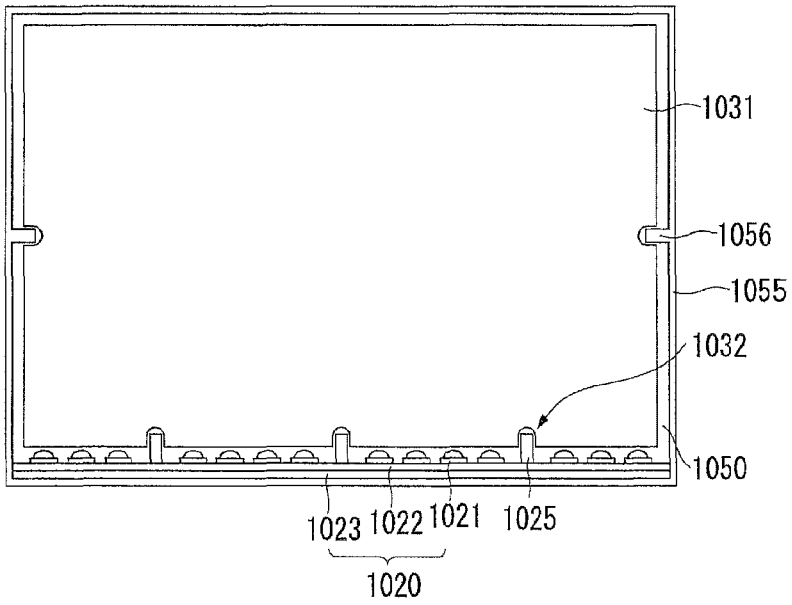
FIGS. 32 to 34 are top plan views illustrating a front surface of a backlight unit according to other embodiments.
Figure 33:
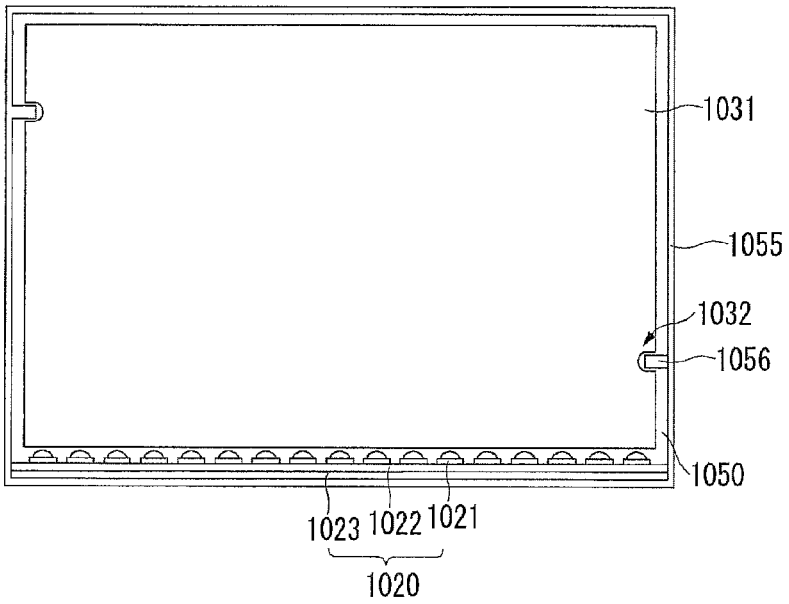
Figure 34:
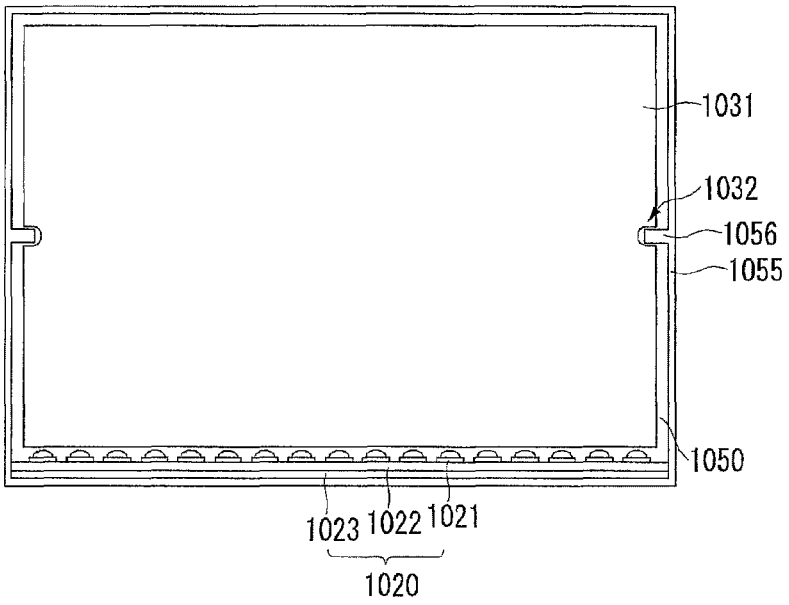

FIGS. 32 to 34 are top plan views illustrating a front surface of a backlight unit according to another embodiment. Referring to FIG. 32, the backlight unit shown in FIG. 31 may further include a fourth protruding portion 1056 that may protrude from a side surface of the side cover 1055. The fourth protruding portion 1056 of the side cover 1055 may be shaped to protrude from the side surface of the side cover 1055 towards the light guiding plate 1031. The fourth protruding portion 1056 may be positioned at the center of a left side surface and a right side surface of the side cover 1055.

The fourth protruding portion 1056 may be coupled to the first concave portion 1032 of the light guiding plate 1031 to further support the light guiding plate 1031 together with the third protruding portion 1025 provided in the LED assembly 1020. In the light guiding plate 1031, the first concave portion 1032 may be formed at a position corresponding to the fourth protruding portion 1056 of the side cover 1055, and may be positioned at the center of the left side and the right side of the light guiding plate 1031.

Referring to FIGS. 33 and 34, in this embodiment, the fourth protruding portion 1056 of the side cover 1055 may be formed to couple to the first concave portion 1032 of the light guiding plate 1031 without the third protruding portion 1025. For example, as shown in FIG. 33, the fourth protruding portions 1056 may be provided on each of an upper part of the left side and a lower part of the right side of the side cover 1055. The first concave portions 1032 may be positioned at an upper part of the left side and an upper part of the right side of the light guiding plate 1031 to correspond to a position of the fourth protruding portion 1056. Therefore, the fourth protruding portion 1056 of the side cover 1055 may be coupled to the first concave portion 1032 of the light guiding plate 1031.

Further, as shown in FIG. 34, the fourth protruding portions 1056 may be provided at the center of the left side and the right side of the side cover 1055. The first concave portions 1032 may be positioned at the center of the left side and the right side of the light guiding plate 1031 to correspond to a position of the fourth protruding portion 1056. Therefore, the fourth protruding portion 1056 of the side cover 1055 may be coupled to the first concave portion 1032 of the light guiding plate 1031.

As described above, in a backlight unit and a liquid crystal display comprising the same, a plurality of protruding portions may be formed on a bottom cover to support and couple an LED assembly and a light guiding plate. Further, by preventing the light guiding plate from contacting with the LED unit assembly through protruding portions of the bottom cover, reliability of the liquid crystal display may be improved.

A liquid crystal display may be used in various fields, for example, in notebook computers and monitors, and may have an advantage over other display devices because of its small size, light weight, and low power consumption. The liquid crystal display may comprise a liquid crystal panel and a backlight unit. The backlight unit may provide light to the liquid crystal panel, and the light may transmit the liquid crystal panel. In this case, the liquid crystal panel may display an image by adjusting a transmittance of light.

The backlight unit may be classified into an edge type and a direct type according to a disposition form of a light source. In the edge type backlight unit, a light source may be disposed at a side surface of a liquid crystal panel, and a light guiding plate may be disposed at a rear surface of the liquid crystal panel to guide light provided from the side surface of the liquid crystal panel to a rear surface of the liquid crystal panel. In the direct type backlight unit, a plurality of light sources may be provided in the rear surface of the liquid crystal panel, and light emitted from the plurality of light sources may be directly provided to the rear surface of the liquid crystal panel.

Various light sources may be used, for example, electro luminescence (EL), a cold cathode fluorescent lamp (CCFL), a hot cathode fluorescent lamp (HCFL), a light emitting diode (LED), or other appropriate light sources. The LED may have a low power consumption and excellent light emission efficiency. When the LED light source is applied to the edge type backlight unit, the LED light source may be mounted on the substrate, and may be fixed to a side surface of the light guiding plate. The fixing or mounting structure of light guiding plate may become complex and may require a complex method of fixing or mounting the light source and light guiding plate. A backlight unit and a liquid crystal display comprising the same as broadly disclosed and embodied herein may fix or mount a light guiding plate thereon to effectively apply light emitted from an LED to the light guiding plate.

A display device is broadly described and embodied herein and may include a display panel having a plurality of electrodes and pixels; and an edge type backlight provided adjacent to the display panel, the backlight having a plurality of optical sheets adjacent to the display panel; a light guide panel having at least one light incident area to receive light from a first direction and a light emitting area to emit light received through the light incident area in a second direction towards the plurality of optical sheets, the first and second directions being different directions; at least one light source, at least one incident area of the light guide panel being adjacent to at least one light source to receive light output; a reflector adjacent to the light guide panel to reflect light towards the second direction; and a bottom cover including a plate, the plate provided adjacent to the reflector and having a prescribed length in the first direction and a prescribed width in a third direction, the plate further including at least one post having a first prescribed height, and the reflector and the light guide panel having at least one opening having a second prescribed height to receive the at least one post.

The display device is disclosed wherein the second prescribed height being greater than the first prescribed height; wherein the plate further includes at least one peg, the at least one peg having a height less than the at least one post, the at least one post being positioned closer to the at least one light source than the at least one peg; and wherein the at least one light source comprises a first LED assembly having a plurality of light emitting diodes provided on a first substrate and arranged in the third direction, the LED assembly further including a first support plate extending in the first direction and provided adjacent to the first substrate, the first support plate including a first opening and a second opening, which are fitted over the at least one post and the at least one peg.

The display device is disclosed wherein the at least one light source comprises a first LED assembly having a plurality of first light emitting diodes provided on a first substrate and arranged in the third direction, the first LED assembly further including a first support plate extending in the first direction and provided adjacent to the first substrate, the first support plate including a first opening and a second opening, the at least one post including a first post and at least one of a second post, a third post or a fourth post, the first post located closest in the first direction to the plurality of first light emitting diodes, the at least one peg including a first peg, the first and second openings fitted over the first post and the first peg, and the at least one opening of the reflector and the light guide panel includes a first slot and at least one of a second slot, a third slot or a fourth slot.

The display device is disclosed wherein the at least one light source further comprises a second LED assembly having a plurality of second light emitting diodes provided on a second substrate and arranged in the third direction, the second LED assembly being provided on a side of the plate opposite from the first LED assembly, the second LED assembly further including a second support plate extending in the first direction and provided adjacent to the second substrate, the second support plate including a third opening and a fourth opening, the second post located closest in the first direction to the plurality of second light emitting diodes, the at least one peg further including a second peg, and the third and fourth openings fitted over the second post and the second peg.

The display device is disclosed wherein the at least one light source further comprises a third LED assembly having a plurality of third light emitting diodes provided on a third substrate and arranged in the first direction, the third LED assembly being provided on a side of the plate between the first LED assembly and the second LED assembly, the third LED assembly further including a third support plate extending in the third direction and provided adjacent to the third substrate, the third support plate including a fifth opening and a sixth opening, the third post located closest in the third direction to the plurality of third light emitting diodes, the at least one peg further including a third peg, and the fifth and sixth openings fitted over the third post and the third peg; and the at least one light source further comprises a fourth LED assembly having a plurality of fourth light emitting diodes provided on a fourth substrate and arranged in the first direction, the fourth LED assembly being provided on a side of the plate between the first LED assembly and the second LED assembly and opposite of the third LED assembly, the fourth LED assembly further including a fourth support plate extending in the third direction and provided adjacent to the fourth substrate, the fourth support plate including a seventh opening and a eighth opening, the fourth post located closest in the third direction to the plurality of fourth light emitting diodes, the at least one peg further including a fourth peg, and the seventh and eighth openings fitted over the fourth post and the fourth peg.

The display device is disclosed wherein the first and second slots are provided at diagonally opposite corners of the light guide panel and the reflector, and the first and second slots fit over the first and second posts of the plate; wherein the first, second, third and fourth slots are provided at the corners of the light guide panel and the reflector, and the first, second, third and fourth slots fit over the first, second, third and fourth posts of the plate; wherein the at least one first post is provided between two adjacent first light emitting diodes separated by a first prescribed distance while remaining first light emitting diodes are separated by a second prescribed distance, the first prescribed distance being greater than the second prescribed distance; and wherein each of the plurality of first light emitting diodes includes a lens, and the lens includes both a concave portion and a convex portion.

A display device is broadly described and embodied herein and may include a display panel having a plurality of electrodes and pixels; and a backlight provided adjacent to the display panel, the backlight having a plurality of optical sheets adjacent to the display panel; a light guide panel having at least one light incident area to receive light from a first direction and a light emitting area to emit light received through the light incident area in a second direction towards the plurality of optical sheets, the first and second directions being different directions; at least one light source, at least one incident area of the light guide panel being adjacent to at least one light source to receive light output; a reflector adjacent to the light guide panel to reflect light towards the second direction; and a bottom cover including a plate, the plate provided adjacent to the reflector and having a prescribed length in the first direction and a prescribed width in a third direction, the plate further including at least one post extending in the second direction, the at least one light source comprising a first LED assembly having a plurality of first light emitting diodes provided on a substrate, which is supported by a first support plate, the first support plate having a first opening to receive the at least one post, the first LED assembly further comprising at least one peg extending in the first direction, the light guide panel having at least one slot to receive the at least one peg.

The display device is disclosed wherein the at least one peg is provided between adjacent first light emitting diodes; wherein the at least one peg and the at least one slot prevent the at least one light guide panel from contacting the plurality of first light emitting diodes; and wherein at least one of the first light emitting diodes includes lens from which light is output toward the at least one light incident area of the light guide panel, and a gap is provided between the lens and the at least one light incident area by the at least one peg and the at least one slot.

The display device is disclosed wherein the at least one peg is provided between two adjacent first light emitting diodes separated by a first prescribed distance while remaining first light emitting diodes are separated by a second prescribed distance, the first prescribed distance being greater than the second prescribed distance; wherein the at least one peg has a first prescribed height in the second direction, and the at least one light guide panel has a second prescribed height in the second direction, the second prescribed height being greater than the first prescribed height; wherein the bottom cover includes a first peg on a first side and a second peg on a second side, the at least one peg provided between the first and second pegs, and the light guide panel further includes first and second slots to receive the first and second pegs; wherein when the display device is oriented in a vertical direction such that the second direction is perpendicular to the direction of gravity, the at least one peg and the first and second pegs support the weight of the light guide panel; and wherein the at least one peg comprises a plurality of pegs, and the at least one slot comprises a plurality of slots to receive the plurality of pegs.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A display device comprising:

a display panel having a plurality of electrodes and pixels; and an edge type backlight provided adjacent to the display panel, the backlight having a plurality of optical sheets adjacent to the display panel;

a light guide panel having at least one light incident area to receive light from a first direction and a light emitting area to emit light received through the light incident area in a second direction towards the plurality of optical sheets, the first and second directions being different directions;

at least one light source, at least one incident area of the light guide panel being adjacent to at least one light source to receive light output;

a reflector adjacent to the light guide panel to reflect light towards the second direction; and a bottom cover including a plate, the plate provided adjacent to the reflector and having a prescribed length in the first direction and a prescribed width in a third direction, the plate further including at least one post having a first prescribed height, and the reflector and the light guide panel having at least one opening having a second prescribed height to receive the at least one post, wherein the plate further includes at least one peg, the at least one peg having a height less than the at least one post, the at least one post being positioned closer to the at least one light source than the at least on peg, and the at least one post and the peg being separate from each other.]

[2. The display device of claim 1, wherein the second prescribed height being greater than the first prescribed height.]

[3. The display device of claim 1, wherein the at least one light source comprises a first LED assembly having a plurality of light emitting diodes provided on a first substrate and arranged in the third direction, the LED assembly further including a first support plate extending in the first direction and provided adjacent to the first substrate, the first support plate including a first opening and a second opening, which are fitted over the at least one post and the at least one peg.]

[4. A display device of comprising:

a display panel having a plurality of electrodes and pixels; and an edge type backlight provided adjacent to the display panel, the backlight having a plurality of optical sheets adjacent to the display panel;

a light guide panel having at least one light incident area to receive light from a first direction and a light emitting area to emit light received through the light incident area in a second direction towards the plurality of optical sheets, the first and second directions being different directions;

at least one light source, at least one incident area of the light guide panel being adjacent to at least one light source to receive light output;

a reflector adjacent to the light guide panel to reflect light towards the second direction; and a bottom cover including a plate, the plate provided adjacent to the reflector and having a prescribed length in the first direction and a prescribed width in a third direction, the plate further including at least one post having a first prescribed height and the reflector and the light guide panel having at least one opening having a second prescribed height to receive the at least one post, wherein the at least one light source comprises a first LED assembly having a plurality of first light emitting diodes provided on a first substrate and arranged in the third direction, the first LED assembly further including a first support plate extending in the first direction and provided adjacent to the first substrate, the first support plate including a first opening and a second opening, the at least one post including a first post and at least one of a second post, a third post or a fourth post, the first post located closest in the first direction to the plurality of first light emitting diodes, the at least one peg including a first peg, the first and second openings fitted over the first post and the first peg, and the at least one opening of the reflector and the light guide panel includes a first slot and at least one of a second slot, a third slot or a fourth slot.]

[5. The display device of claim 4, wherein the at least one light source further comprises a second LED assembly having a plurality of second light emitting diodes provided on a second substrate and arranged in the third direction, the second LED assembly being provided on a side of the plate opposite from the first LED assembly, the second LED assembly further including a second support plate extending in the first direction and provided adjacent to the second substrate, the second support plate including a third opening and a fourth opening, the second post located closest in the first direction to the plurality of second light emitting diodes, the at least one peg further including a second peg, and the third and fourth openings fitted over the second post and the second peg.]

[6. The display device of claim 5, wherein the at least one light source further comprises a third LED assembly having a plurality of third light emitting diodes provided on a third substrate and arranged in the first direction, the third LED assembly being provided on a side of the plate between the first LED assembly and the second LED assembly, the third LED assembly further including a third support plate extending in the third direction and provided adjacent to the third substrate, the third support plate including a fifth opening and a sixth opening, the third post located closest in the third direction to the plurality of third light emitting diodes, the at least one peg further including a third peg, and the fifth and sixth openings fitted over the third post and the third peg; and the at least one light source further comprises a fourth LED assembly having a plurality of fourth light emitting diodes provided on a fourth substrate and arranged in the first direction, the fourth LED assembly being provided on a side of the plate between the first LED assembly and the second LED assembly and opposite of the third LED assembly, the fourth LED assembly further including a fourth support plate extending in the third direction and provided adjacent to the fourth substrate, the fourth support plate including a seventh opening and a eighth opening, the fourth post located closest in the third direction to the plurality of fourth light emitting diodes, the at least one peg further including a fourth peg, and the seventh and eighth openings fitted over the fourth post and the fourth peg.]

[7. The display device of claim 4, wherein the first and second slots are provided at diagonally opposite corners of the light guide panel and the reflector, and the first and second slots fit over the first and second posts of the plate.]

[8. The display device of claim 7, wherein the first, second, third and fourth slots are provided at the corners of the light guide panel and the reflector, and the first, second, third and fourth slots fit over the first, second, third and fourth posts of the plate.]

[9. The display device of claim 3, wherein the at least one first post is provided between two adjacent first light emitting diodes separated by a first prescribed distance while remaining first light emitting diodes are separated by a second prescribed distance, the first prescribed distance being greater than the second prescribed distance.]

[10. The display device of claim 3, wherein each of the plurality of first light emitting diodes includes a lens, and the lens includes both a concave portion and a convex portion.]

[11. A display device comprising:

a display panel having a plurality of electrodes and pixels; and a backlight provided adjacent to the display panel, the backlight having a plurality of optical sheets adjacent to the display panel;

a light guide panel having at least one light incident area to receive light from a first direction and a light emitting area to emit light received through the light incident area in a second direction towards the plurality of optical sheets, the first and second directions being different directions;

at least one light source, at least one incident area of the light guide panel being adjacent to at least one light source to receive light output;

a reflector adjacent to the light guide panel to reflect light towards the second direction; and a bottom cover including a plate, the plate provided adjacent to the reflector and having a prescribed length in the first direction and a prescribed width in a third direction, the plate further including at least one post extending in the second direction, the at least one light source comprising a first LED assembly having a plurality of first light emitting diodes provided on a substrate, which is supported by a first support plate, the first support plate having a first opening to receive the at least one post, the first LED assembly further comprising at least one peg extending in the first direction, the light guide panel having at least one slot to receive the at least one peg.]

[12. The display device of claim 11, wherein the at least one peg is provided between adjacent first light emitting diodes.]

[13. The display device of claim 12, wherein the at least one peg and the at least one slot prevent the at least one light guide panel from contacting the plurality of first light emitting diodes.]

[14. The display device of claim 12, wherein at least one of the first light emitting diodes includes lens from which light is output toward the at least one light incident area of the light guide panel, and a gap is provided between the lens and the at least one light incident area by the at least one peg and the at least one slot.]

[15. The display device of claim 11, wherein the at least one peg is provided between two adjacent first light emitting diodes separated by a first prescribed distance while remaining first light emitting diodes are separated by a second prescribed distance, the first prescribed distance being greater than the second prescribed distance.]

[16. The display device of claim 11, wherein the at least one peg has a first prescribed height in the second direction, and the at least one light guide panel has a second prescribed height in the second direction, the second prescribed height being greater than the first prescribed height.]

[17. The display device of claim 11, wherein the bottom cover includes a first peg on a first side and a second peg on a second side, the at least one peg provided between the first and second pegs, and the light guide panel further includes first and second slots to receive the first and second pegs.]

[18. The display device of claim 17, wherein when the display device is oriented in a vertical direction such that the second direction is perpendicular to the direction of gravity, the at least one peg and the first and second pegs support the weight of the light guide panel.]

[19. The display device of claim 18, wherein the at least one peg comprises a plurality of pegs, and the at least one slot comprises a plurality of slots to receive the plurality of pegs.]

*20. A backlight unit, comprising:*

*a light guiding plate;*

*a light source assembly;*

*a reflector disposed below the light guiding plate to reflect light from the light source assembly towards the light guiding plate;*

*a bottom cover disposed below the reflector and including:*

*a first protrusion protruding therefrom and being in contact with a side surface of the light guiding plate to support the light guiding plate; and*

*a second protrusion protruding therefrom to support the light source assembly, wherein a length of the first protrusion is greater than a length of the second protrusion,*

*wherein the light source assembly includes:*

*a plurality of light sources facing the side surface of the light guiding plate;*

*a substrate on which the plurality of light sources are arranged; and*

*a support, including:*

*a vertical part on which the substrate is mounted, and*

*a horizontal part perpendicularly bent at a lower end of the vertical part to be placed on the bottom cover, and having:*

*a first hole in which the first protrusion inserted; and*

*a second hole in which the second protrusion is inserted.*

*21. The backlight unit according to claim 20, wherein the first protrusion is configured to pass through the reflector to support the light guiding plate.*

*22. The backlight unit according to claim 20, wherein a reference surface is defined as a vertical surface passing by front ends of the plurality of light sources,*

*a distance between the reference surface and the second protrusion is greater than a distance between the reference surface and the first protrusion.*

*23. The backlight unit of claim 20, further comprising third protrusions positioned at left and right sides of the bottom cover to support left and right sides of the light guiding plate.*

*24. The backlight unit of claim 23, further comprising concave portions formed in left and right sides of the light guiding plate,*

*wherein the third protrusions are respectively inserted in the concave portions to support the left and right sides of the light guiding plate.*

*25. The backlight unit of claim 24, wherein the third protrusions are positioned at an upper part of the left side of the bottom cover and a lower part of the right side of the bottom cover, and*

*wherein the concave portions are positioned at an upper part of the left side of the light guiding plate and a lower part of the right side of the light guiding plate.*

*26. The backlight unit of claim 24, wherein the third protrusions are respectively positioned at central parts of the left and right sides of the bottom cover, and*

*wherein the concave portions are respectively positioned at central parts of the left and right sides of the light guiding plate.*

*27. The backlight unit of claim 20, wherein the first protrusion is configured to extend further than the first hole after passing through the first hole.*

* * * * *